(12) United States Patent
Torii et al.

(10) Patent No.: US 10,537,874 B2
(45) Date of Patent: Jan. 21, 2020

(54) METHOD FOR PRODUCING PARTICULATE WATER-ABSORBING AGENT

(71) Applicant: NIPPON SHOKUBAI CO., LTD., Osaka-shi, Osaka (JP)

(72) Inventors: Kazushi Torii, Hyogo (JP); Kunihiko Ishizaki, Hyogo (JP); Shinichi Fujino, Hyogo (JP); Ryota Wakabayashi, Hyogo (JP); Motohiro Imura, Hyogo (JP)

(73) Assignee: NIPPON SHOKUBAI CO., LTD., Osaka-shi, Osaka (JP)

( * ) Notice: Subject to any disclaimer, the term of this patent is extended or adjusted under 35 U.S.C. 154(b) by 311 days.

(21) Appl. No.: 15/561,649

(22) PCT Filed: Mar. 30, 2016

(86) PCT No.: PCT/JP2016/060497
§ 371 (c)(1),
(2) Date: Sep. 26, 2017

(87) PCT Pub. No.: WO2016/159144
PCT Pub. Date: Oct. 6, 2016

(65) Prior Publication Data
US 2018/0071714 A1    Mar. 15, 2018

(30) Foreign Application Priority Data

Apr. 2, 2015   (JP) ................................ 2015-076259

(51) Int. Cl.
| | | |
|---|---|---|
| *B01J 23/62* | (2006.01) | |
| *B01J 20/26* | (2006.01) | |
| *C08F 20/06* | (2006.01) | |
| *C08J 3/12* | (2006.01) | |
| *C08F 2/32* | (2006.01) | |
| *B01D 17/02* | (2006.01) | |
| *C08J 3/075* | (2006.01) | |

(52) U.S. Cl.
CPC ........ *B01J 20/261* (2013.01); *B01D 17/0202* (2013.01); *C08F 2/32* (2013.01); *C08F 20/06* (2013.01); *C08J 3/075* (2013.01); *C08J 3/12* (2013.01); *B01D 2252/205* (2013.01); *B01D 2257/80* (2013.01)

(58) Field of Classification Search
CPC . B01J 23/62; B01J 23/626; B01J 21/04; B01J 23/96; B01J 35/0026; B01J 35/1085; B01J 35/109; B01J 38/02; C07C 5/3337; C07C 521/04; C07C 2523/58; C07C 2523/62
USPC .......................................................... 502/56
See application file for complete search history.

(56) References Cited

U.S. PATENT DOCUMENTS

| | | | |
|---|---|---|---|
| 4,734,478 | A | 3/1988 | Tsubakimoto et al. |
| 4,755,562 | A | 7/1988 | Alexander et al. |
| 4,783,510 | A | 11/1988 | Saotome |
| 4,824,901 | A | 4/1989 | Alexander et al. |
| 5,409,771 | A | 4/1995 | Dahmen et al. |
| 5,610,208 | A | 3/1997 | Dairoku et al. |
| 5,672,633 | A | 9/1997 | Brehm et al. |
| 6,164,455 | A | 12/2000 | Kakita et al. |
| 6,239,230 | B1 | 5/2001 | Eckert et al. |
| 6,472,478 | B1 | 10/2002 | Funk et al. |
| 6,559,239 | B1 | 5/2003 | Riegel et al. |
| 6,605,673 | B1 | 8/2003 | Mertens et al. |
| 6,620,899 | B1 | 9/2003 | Morken et al. |
| 6,657,015 | B1 | 12/2003 | Riegel et al. |
| 6,809,158 | B2 | 10/2004 | Ikeuchi et al. |
| 7,915,363 | B2 | 3/2011 | Funk et al. |
| 2004/0106745 | A1 | 6/2004 | Nakashima et al. |
| 2005/0048221 | A1 | 3/2005 | Irie et al. |
| 2008/0202987 | A1 | 8/2008 | Weismantel et al. |
| 2009/0194462 | A1 | 8/2009 | Stueven et al. |
| 2009/0261023 | A1 | 10/2009 | Stueven et al. |
| 2009/0266747 | A1 | 10/2009 | Stueven et al. |
| 2011/0003926 | A1 | 1/2011 | Nogi et al. |
| 2011/0006140 | A1 | 1/2011 | Ishizaki et al. |
| 2011/0009590 | A1 | 1/2011 | Matsumoto et al. |
| 2011/0011491 | A1 | 1/2011 | Matsumoto et al. |
| 2011/0015351 | A1 | 1/2011 | Nogi et al. |
| 2011/0028670 | A1 | 2/2011 | Matsumoto et al. |
| 2011/0088806 | A1 | 4/2011 | Nogi et al. |
| 2011/0110730 | A1 | 5/2011 | Nogi et al. |
| 2011/0166300 | A1 | 7/2011 | Dairoku et al. |

(Continued)

FOREIGN PATENT DOCUMENTS

| | | |
|---|---|---|
| EP | 0940149 A1 | 9/1999 |
| EP | 1824910 A2 | 8/2007 |

(Continued)

OTHER PUBLICATIONS

International Search Report dated Jun. 28, 2016 issued in International Patent Application No. PCT/JP2016/060497.

(Continued)

*Primary Examiner* — Edward M Johnson
(74) *Attorney, Agent, or Firm* — Harness Dickey & Pierce P.L.C.

(57) ABSTRACT

Provided is a method for producing a particulate water absorbing agent, the method including the steps of: a polymerization step of polymerizing an acrylic acid (salt)-based aqueous monomer solution so as to obtain a crosslinked hydrogel polymer; a drying step of drying the crosslinked hydrogel polymer so as to obtain a dried polymer; a classification step of classifying a polymer subjected to classification so as to obtain a water-absorbing resin powder having a specific particle size; and a surface-crosslinking step of surface-crosslinking the water-absorbing resin powder that is not surface crosslinked, wherein the classification step is carried out at least either or both of before and/or after the surface-crosslinking step but after said drying step, and wherein a hole shape of a classification sieve used in the classification step is an irregular polygonal or non-circular.

20 Claims, 1 Drawing Sheet

(56) References Cited

U.S. PATENT DOCUMENTS

| | | |
|---|---|---|
| 2012/0220733 A1 | 8/2012 | Machida et al. |
| 2012/0220745 A1 | 8/2012 | Machida et al. |
| 2012/0298915 A1 | 11/2012 | Okuda et al. |
| 2013/0066019 A1 | 3/2013 | Okuda et al. |
| 2013/0098809 A1 | 4/2013 | Stueven et al. |
| 2013/0123435 A1 | 5/2013 | Okuda et al. |
| 2015/0210843 A1 | 7/2015 | Kimura et al. |
| 2015/0240013 A1 | 8/2015 | Matsumoto et al. |
| 2017/0044332 A1 | 2/2017 | Kimura et al. |
| 2017/0216817 A1 | 8/2017 | Torii et al. |

FOREIGN PATENT DOCUMENTS

| | | |
|---|---|---|
| JP | 06-107800 | 4/1994 |
| JP | 10-202187 | 8/1998 |
| JP | 2008/526498 A | 7/2008 |
| WO | WO-2006/033477 A1 | 3/2006 |
| WO | WO-2006/062258 A2 | 6/2006 |
| WO | WO-2006/074816 A1 | 7/2006 |
| WO | WO-2008/037672 A1 | 4/2008 |
| WO | WO-2008/037673 A1 | 4/2008 |
| WO | WO-2008/037675 A1 | 4/2008 |
| WO | WO-2008/123477 A1 | 10/2008 |
| WO | WO-2009/113678 A1 | 9/2009 |
| WO | WO-2010/032694 A1 | 3/2010 |
| WO | WO-2011/034146 A1 | 3/2011 |
| WO | WO-2011/034147 A1 | 3/2011 |
| WO | WO-2011/099586 A1 | 8/2011 |
| WO | WO-2011/115216 A1 | 9/2011 |
| WO | WO-2011/115221 A1 | 9/2011 |
| WO | WO-2014/021432 A1 | 2/2014 |
| WO | WO-2014/033083 A1 | 3/2014 |
| WO | WO-2014/041969 A1 | 3/2014 |
| WO | WO-2016/052537 A1 | 4/2016 |

OTHER PUBLICATIONS

English Translation of International Preliminary Report on Patentability for International Patent Application No. PCT/JP2016/060497.

Buchholz F. et al. (1998) "Commercial Processes for the Manufacture of Superabsorbent Polymers" Modern Superabsorbent Polymer Technology, 69-118.

European Search Report for European Patent Application No. 16773025.8 dated Oct. 17, 2018 (8 pages).

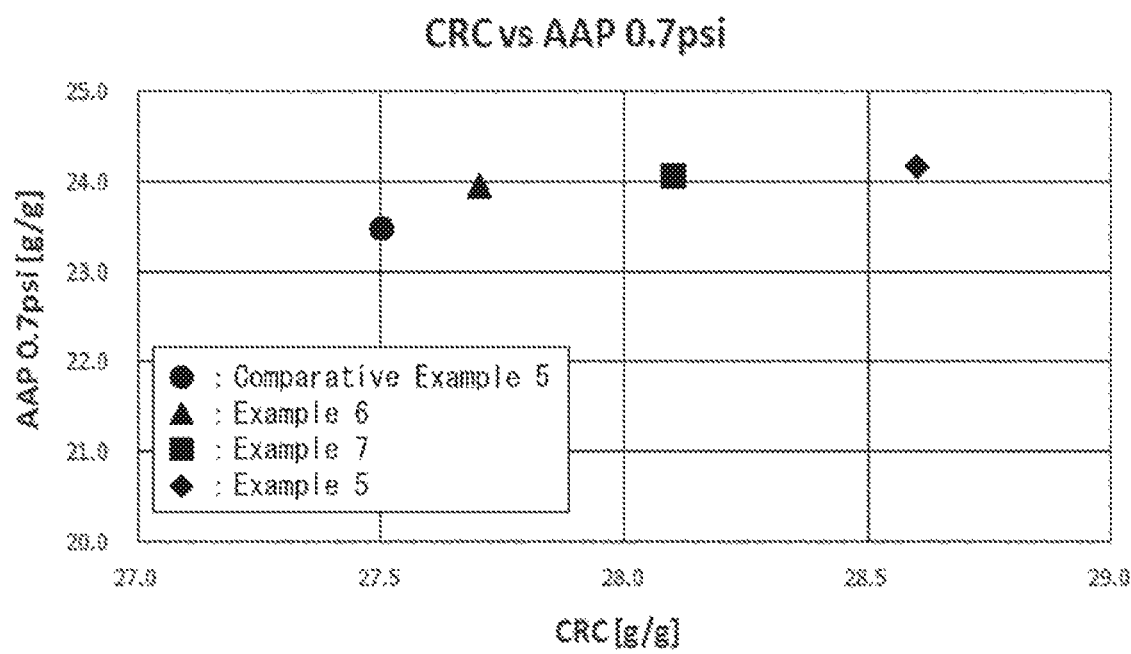

METHOD FOR PRODUCING PARTICULATE WATER-ABSORBING AGENT

PRIORITY STATEMENT

This patent application is a U.S. national stage filing under 35 U.S.C. § 371 of International Application No. PCT/JP2016/060497 filed 30 Mar. 2016, which claims priority to Japanese Patent Application No. 2015-076259 filed on 2 Apr. 2015. The entire disclosures of each of the above recited applications are incorporated herein by reference.

TECHNICAL FIELD

The present invention relates to a method for producing a particulate water absorbing agent containing a polyacrylic acid (salt)-based water-absorbing resin as a main component. More specifically, the present invention relates to a method for producing a particulate water absorbing agent containing, as a main component, a polyacrylic acid (salt)-based water-absorbing resin excellent in fluid retention capacity under pressure.

BACKGROUND ART

Water-absorbing resin (Super Absorbent Polymer or SAP) is a water-swellable, water-insoluble polymer gelling agent. Water-absorbing resin is used for various applications. For example, water-absorbing resin is used in absorbent articles such as disposable diapers, sanitary napkins, and incontinence articles for adults, agricultural and horticultural water retaining agents, industrial waterproofing agents, and the like. Many monomers and hydrophilic polymers have been proposed as raw materials of such water-absorbing resin Front the viewpoint of performance and cost, a polyacrylic acid (salt)-based water-absorbing resin containing an acrylic acid and/or a salt thereof as a monomer(s) is most often used as such water-absorbing resin The above water-absorbing resin is produced through steps such as a polymerization step, a drying step, a classification step, a surface-crosslinking step, and an addition step of adding one or more of various modifiers (Non-Patent Literature 1). Further, along with enhancement in performance and reduction in thickness of disposable diapers which are one of major applications of water-absorbing resin, water-absorbing resin is being required to have higher performance in terms of, for example, fluid retention capacity (e.g., CRC and FSC), gel strength, water-soluble component, water absorption speed (e.g., FSR and Vortex), fluid retention capacity under pressure (e.g., AAP), liquid permeability (e.g., SFC and GBP), particle size distribution, urine resistance, antibacterial property, impact resistance, powder fluidity, deodorizing property (e.g., pHAI (=(CRC+AAP)×(7−pH)), coloration resistance, and low dustiness. In addition, in general, improvement in performance of water-absorbing resin is incompatible with improvement in productivity of water-absorbing resin. It has been always an important issue to concurrently improve both performance and productivity of water-absorbing resin.

In view of the above issue, with regard to each step from the polymerization step to the addition step of adding one or more of various modifiers, many improved techniques have been proposed as measures to improve performance of water-absorbing resin. In particular, many proposals have been made with regard to improvement of the surface-crosslinking step and development of modifiers (Patent Literatures 17 through 37). In addition to the above conventional improved techniques, in recent years, technical improvement has been made for the classification step. Specifically, proposals have been made on measures to improve productivity and performance of water-absorbing resin by prevention of aggregation during classification and improvement of classification efficiency (Patent Literatures 1 through 15).

The following techniques are the proposals which have been proposed so far as measures to improve performance and/or productivity of water-absorbing resin in the classification step: a technique in which electricity is removed from a classification apparatus (Patent Literature 1); a technique in which a stretch tension of a classification mesh is set within a predetermined range (Patent Literature 2); a technique in which tapping balls are provided below a classification mesh (Patent Literature 3); a technique using a plurality of classification meshes that are substantially identical in mesh size (Patent Literature 4); a technique in which classification is carried out under airflow (Patent Literature 5); a technique in which classification is carried out under reduced pressure (Patent Literatures 6 and 7); a technique in which a classification apparatus is heated and heat in the classification apparatus is retained (Patent Literature 8); a technique in which a guide is provided on a surface of a classification mesh (Patent Literature 9); a technique in which classification is performed both before and after surface-crosslinking (Patent Literature 10); a technique using a plurality of sieves (Patent Literature 11); a technique in which a classification apparatus is vibrated at a predetermined number of vibrations (Patent Literature 12); a technique specifying a second classification step after addition of water and a conveying step subsequent to the second classification step (Patent Literature 13); a technique specifying a circulation ratio of water-absorbing resin in pulverization and classification steps (Patent Literatures 14 and 15); and the like.

Moreover, there has also been a disclosure of a water-absorbing resin classification method in which a classification operation is additionally performed two times after surface-crosslinking and in the second classification operation after the surface-crosslinking, a Ton-Cap sieve having a specific mesh size is used (a classification mesh used in the second classification operation after the surface-crosslinking has a larger mesh size in a direction of long sides of holes of the classification mesh, as compared to another classification mesh used in the first classification step after the surface-crosslinking) (Patent Literature 16).

CITATION LIST

Patent Literatures

[Patent Literature 1] Pamphlet of International Publication No. WO 2010/032691.
[Patent Literature 2] Pamphlet of International Publication No. WO 2011/115221
[Patent Literature 3] Pamphlet of International Publication No. WO 2011/115216
[Patent Literature 4] Pamphlet of International Publication No. WO 2014/021432
[Patent Literature 5] Pamphlet of International Publication No. WO 2008/123477
[Patent Literature 6] Pamphlet of International Publication No. WO 2006/074816
[Patent Literature 7] Pamphlet of International Publication No. WO 2009/113678

[Patent Literature 8] Specification of U.S. Pat. No. 6,164,455
[Patent Literature 9] Pamphlet of International Publication No. WO 2008/037672
[Patent Literature 10] Pamphlet of International Publication No. WO 2008/037673
[Patent Literature 11] Pamphlet of International Publication No. WO 2008/037675
[Patent Literature 12] Pamphlet of International Publication No. WO 2014/033083
[Patent Literature 13] Pamphlet of international Publication No. WO 2011/099586
[Patent Literature 14] Pamphlet of International Publication No. WO 2011/034146
[Patent Literature 15] Pamphlet of International Publication No. WO 2011/034147
[Patent Literature 16] International Application No. PCTNP2015/077577 (International Application Date: Sep. 29, 2015; accordingly, unpublished)
[Patent Literature 17] Specification of U.S. Pat. No. 6,809,158
[Patent Literature 18] Specification of U.S. Pat. No. 4,734,478
[Patent Literature 19] Specification of U.S. Pat. No. 4,755,562
[Patent Literature 20] Specification of U.S. Pat. No. 4,824,901
[Patent Literature 21] Specification of U.S. Pat. No. 6,239,230
[Patent Literature 22] Specification of U.S. Pat. No. 6,559,239
[Patent Literature 23] Specification of U.S. Pat. No. 6,472,478
[Patent Literature 24] Specification of U.S. Pat. No. 6,657,015
[Patent Literature 25] Specification of U.S. Pat. No. 5,672,633
[Patent Literature 26] Specification of European Patent Application Publication No. 0940149
[Patent Literature 27] Pamphlet of International Publication No. WO 2006/033477
[Patent Literature 28] Specification of U.S. Pat. Application. Publication No. 2005/48221
[Patent Literature 29] Specification of U.S. Pat. No. 4,783,510
[Patent Literature 30] Specification of European Patent No. 1824910
[Patent Literature 31] Specification of U.S. Pat. No. 6,605,673
[Patent Literature 32] Specification of U.S. Pat. No. 6,620,899
[Patent Literature 33] Specification of US Patent Application. Publication No. 2004/106745
[Patent Literature 34] Specification of U.S. Pat. No. 5,610,208
[Patent Literature 35] Specification of U.S. Pat. No. 7,915,363
[Patent Literature 36] Specification of U.S. Pat. No. 5,409,771
[Patent Literature 37] Pamphlet of International Publication No. WO 2014/041969

Non-Patent Literature

[Non-Patent Literature 1] Modern Superabsorbent Polymer Technology (1998) (particularly, Chapter 3 (pp. 69-118))

SUMMARY OF INVENTION

Technical Problem

In addition to improved techniques disclosed in Patent Literatures 17 through 37, improvement in the classification step of water-absorbing resin has been made so far in various manners as disclosed in the above Patent Literatures 1 through 15 and the like. However, though improvement of classification efficiency and improvement and stabilization of liquid permeability have been taken as objects, water absorption performance under pressure (fluid retention capacity under pressure) has not drawn attention and there has been a problem that improvement of the fluid retention capacity under pressure is difficult. Meanwhile, Patent Literature 16, which has not been published yet, uses specific sieves in a specific classification step and focuses on a gel elastic modulus index (EMI) of water-absorbing resin. In Patent Literature 16, however, there has still been a room for improvement of various other physical properties.

In view of the above, in order to improve the above problems, an object of the present invention is to provide a simple method, which requires neither a change in raw materials nor a large equipment investment, for improving water absorption performance (e.g., fluid retention capacity, fluid retention capacity under pressure, liquid permeability, and the like) of a particulate water absorbing agent containing a polyacrylic acid (salt)-based water-absorbing resin as a main component.

Solution to Problem

In order to solve the above problems, the inventors of the present invention have made diligent studies. As a result, the inventors have found that water absorption performance (in particular, fluid retention capacity under pressure (AAP), and moreover, liquid permeability (SFC and GBP)) of a resultant particulate water absorbing agent improves in a case where classification is carried out by using a sieve including a classification mesh having irregular polygonal openings or non-circular openings (preferably, rectangular or oval openings) in a classification step in which conventionally, attention has been focused only on the particle diameter of a water-absorbing resin Consequently, the inventors have accomplished the present invention.

In other words, a method for producing a particulate water absorbing agent in accordance with the present invention is a method for producing a particulate water absorbing agent containing a polyacrylic acid (salt)-based water-absorbing resin as a main component, the method including a polymerization step of polymerizing an acrylic acid (salt)-based aqueous monomer solution so as to obtain a crosslinked hydrogel polymer; a drying step of drying said crosslinked hydrogel polymer so as to obtain a dried polymer; a classification step of classifying a polymer subjected to classification; and a surface-crosslinking step of surface-crosslinking an unsurface-crosslinked water-absorbing resin powder, wherein the classification step is carried out at least either or both of before and/or after the surface-crosslinking step but after said drying step, and wherein a hole shape of a classification sieve used in the classification step is irregular polygonal or non-circular.

Advantageous Effects of Invention

The present invention makes it possible to improve water absorption performance (in particular, fluid retention capacity under pressure (AAP), and moreover, liquid permeability (SFC and GBP)) of a particulate water absorbing agent obtained by a method for producing a particulate water absorbing agent including a polymerization step, a drying step, a classification step and a surface-crosslinking step.

BRIEF DESCRIPTION OF DRAWINGS

FIG. 1 is a graph showing physical properties (CRC and AAP 0.7 psi) of respective particulate water absorbing agents of Comparative Example 5 and Examples 5 through 7.

DESCRIPTION OF EMBODIMENTS

The following description will discuss in detail a method for producing a particulate water absorbing agent in accordance with the present invention. The present invention is not limited in scope to the description below, and may be altered from the examples below and practiced as appropriate as long as such alteration is not a departure from the scope of the present invention. Specifically, the present invention is not limited to the embodiments below, but can be altered by a skilled person in the art within the scope of the claims. An embodiment derived from a proper combination of technical means each disclosed in a different embodiment is also encompassed in the technical scope of the present invention.

[1] Definitions of Terms

[1-1] "Water-Absorbing Resin", "Water-Absorbing Resin Powder", and "Particulate Water Absorbing Agent"

The term "water-absorbing resin" as used for the present invention means a water-swellable, water-insoluble polymer gelling agent. The expression "water-swellable" means that a centrifuge retention capacity (CRC) as defined in ERT 441.2-02 is not less than 5 g/g. The expression "water-insoluble" means that a water-soluble component (Ext) as defined in ERT 470.2-02 is not more than 50 weight %.

The water-absorbing resin can be designed according to its application and intended use, and is not limited to a particular design. The water-absorbing resin however is preferably a hydrophilic crosslinked polymer that has been obtained by crosslinking and polymerizing unsaturated monomers that have a carboxyl group.

Moreover, the water-absorbing resin is not limited to a form in which the water-absorbing resin is wholly (that is, 100 weight %) a crosslinked polymer. The water-absorbing resin may be a water-absorbing resin composition that contains a component(s), such as an additive, other than a component water-absorbing resin as long as the above physical properties (CRC and Ext) satisfy the above numerical range. The component(s) other than the component water-absorbing resin in the "water-absorbing resin" can be, for example, water, from the viewpoint of a water absorption speed and impact resistance of powder (particles). In a case where the "water-absorbing resin" is a water-absorbing resin composition containing a component(s) other than a component water-absorbing resin, a content of the component water-absorbing resin is in a range of preferably 70 weight % to 99.9 weight %, more preferably 80 weight % to 99.7 weight %, and even more preferably 90 weight % to 99.5 weight %. Note that in the present invention, all water-absorbing resins including water-absorbing resin compositions are collectively called "water absorbing resins".

The term "water-absorbing resin powder" as used for the present invention means a water-absorbing resin having a certain fluidity as powder. As the fluidity, a Flow Rate (ERT 450.2-02), or a PSD (ERT 420.2-02) is measurable. Further, the "water-absorbing resin powder" means a water-absorbing resin which can be classified by a sieve. Note that though in general, a matter having a particle diameter of not less than 1 mm may be referred to as "particles" whereas a matter having a particle diameter of less than 1 mm may be referred to as "powder", distinction between "particles" and "powder" is not made in the present invention. In the present invention, any water-absorbing resin supplied in a surface-crosslinking step (described later) is referred to as "water-absorbing resin powder".

The "water-absorbing resin" as used for the present invention may refer to not only a pre-shipment end product but also intermediates (e.g., a crosslinked hydrogel polymer after polymerization, a dried polymer after drying, a water-absorbing resin powder before surface crosslinking, water-absorbing resin particles after surface crosslinking, etc.) produced during a production process of the water-absorbing resin. All of the above product and intermediates are collectively called "water-absorbing resin".

The "particulate water absorbing agent" as used for the present invention means a water-absorbing resin as an end product. Therefore, in a case where classification (hereinafter, which may be also referred to as "sizing") is performed after the surface-crosslinking step, the water-absorbing resin after sizing falls under the "particulate water absorbing agent". Further, the particulate water absorbing agent contains, as a main component, particularly a water-absorbing resin that is surface-crosslinked, and also contains, as an optional component(s), an additive(s) (described later) and/or water. Note that the term "main component" means that a ratio of the water-absorbing resin in the particulate water absorbing agent is preferably 60 weight % to 100 weight %, more preferably 70 weight % to 100 weight %, even more preferably 80 weight % to 100 weight %, and particularly preferably 90 weight % to 100 weight %.

[1-2] "Polyacrylic Acid (Salt)"

The term "polyacrylic acid (salt)" as used in the present invention refers to polyacrylic acid and/or a salt thereof, and means a cross-linked polymer that contains, as a main component, a repeating unit of acrylic acid and/or a salt thereof (hereinafter referred to as "acrylic acid (salt)") and that contains a graft component as an optional component.

The term "main component" means that the acrylic acid (salt) is used (contained) in an amount of preferably 50 mol % to 100 mol %, more preferably 70 mol % to 100 mol %, even more preferably 90 mol % to 100 mol %, and particularly preferably substantially 100 mol % per a total amount of monomers used in polymerization (excluding an internal crosslinking agent).

The "polyacrylic acid salt" which is used as a crosslinked polymer includes a water-soluble salt and preferably includes a monovalent salt, more preferably includes an acrylic acid metal salt or ammonium salt, even more preferably includes an alkali metal salt, and especially even more preferably includes a sodium salt.

Note that a water-absorbing resin which contains the above "polyacrylic acid (salt)" is referred to as the "polyacrylic acid (salt)-based water-absorbing resin".

[1-3] EDANA and ERT

The term "EDANA" is an acronym for the European Disposables and Nonwovens Associations. The term "ERT" is an acronym for EDANA Recommended Test Methods, which are European standard (de facto international standard) methods for measuring physical properties of water-absorbing resin. For the present application, unless otherwise noted, measurements of physical properties of water-absorbing resin are taken in accordance with the ERT (Known Literature: Revised in 2002).

[1-3-1] "CRC" (ERT 441.2-02)

The term "CRC" is an acronym for "centrifuge retention capacity", and refers to a fluid retention capacity without pressure (hereinafter, which may be referred to also as "fluid retention capacity"). Specifically, "CRC" is fluid retention capacity (unit; gig) measured after 0.200 g of a water-absorbing resin contained in a nonwoven fabric bag is immersed and allowed to freely swell in a large excess of a 0.9 weight % aqueous sodium chloride solution for 30 minutes and then drained by a centrifugal separator (at 250 G) for 3 minutes.

[1-3-2] "AAP" (ERT 442.2-02)

The term "AAP" is an acronym for "absorption against pressure", and refers to a fluid retention capacity under pressure. Specifically, "AAP" refers to a fluid retention capacity (unit: g/g) measured after 0.900 g of a water-absorbing resin has been swollen in a large excess of a 0.9 weight % aqueous sodium chloride solution for 1 hour under a load of 2.06 kPa (0.3 psi, 21 g/cm$^2$) (hereinafter, this "AAP" is referred to also as "AAP 0.3 psi") The above condition of the load for measurement: of "AAP" may be changed to a load of 4.83 kPa (0.7 psi, 50 g/cm$^2$) (hereinafter, the "AAP" in this case is referred to also as "AAP 0.7 psi"). Note that ERT 442.2-02 uses the term "Absorption Under Pressure", which refers to substantially the same thing as "AAP".

[1-3-3] "Ext" (ERT 470.2-02)

The term "Ext" is an abbreviation for "Extractables", and refers to a water-soluble component (water-soluble component amount) of a water-absorbing resin Specifically, "Ext" refers to an amount of substance (unit; weight %) which is dissolved in 200 ml of a 0.9 weight % aqueous sodium chloride solution, after 1.0 g of a water-absorbing resin is added to the 0.9 weight % aqueous sodium chloride solution and a resulting mixture is stirred at 500 rpm for 16 hours. Note that pH titration is used for measurement of a water-soluble component.

[1-3-4] "PSD" (ERT 420.2-02)

The term "PSD" is an acronym for "particle size distribution", and refers to a particle size distribution that is measured by sieve classification. The weight average particle diameter (D50) and the logarithmic standard deviation (σζ) of the particle diameter distribution are measured according to a method similar to "(3) Mass-Average Particle Diameter (D50) and Logarithmic Standard Deviation (σζ) of Particle Diameter Distribution", which is a method disclosed in U.S. Pat. No. 7,638,570.

[1-4] Other

In the present specification, a range "X to Y" means "not less than X and not more than Y". "t (ton)", which is a unit of weight, means "metric ton". Moreover, "ppm" means "ppm by weight" or "ppm by mass". Further, "weight" is synonymous with "mass", "weight %" is synonymous with "mass %", and "parts by mass" is synonymous with "parts by weight". Furthermore, " . . . acid (salt)" means " . . . acid and/or salt thereof", and "(meth)acrylic" means "acrylic and/or methacrylic".

[2] Method for Producing Particulate Water Absorbing Agent

[2-1] Polymerization Step

This step is a step of obtaining a crosslinked hydrogel polymer (hereinafter, referred to also as "hydrogel"). The following describes the polymerization step by providing, as an example, a step of obtaining a hydrogel by polymerization of an aqueous monomer solution containing an acrylic acid (salt) as a main component (i.e., an acrylic acid (salt)-based aqueous monomer solution).

(a) Monomers (Excluding Internal Crosslinking Agent)

A particulate water absorbing agent obtained by a production method in accordance with the present invention is obtained by using, as a raw material, an aqueous monomer solution containing an acrylic acid (salt) as a main component. Note that in the aqueous monomer solution, a monomer concentration. (solid content concentration) is in a range of normally 10 weight % to 90 weight % and preferably 20 weight % to 80 weight %.

Further, in a case where monomers are polymerized in an aqueous solution, it is possible to acid as necessary one or more of polymer compounds such as a surfactant, a polyacrylic acid (salt), starch, cellulose, and polyvinyl alcohol, various chelating agent, and various additives in an amount in a range of preferably not more than 30 weight %, and more preferably 0.001 weight % to 20 weight % relative to the monomers.

Further, from the viewpoint of water absorption performance, it is preferable that a hydrogel obtained through polymerization of the aqueous monomer solution is a polymer having an acid group which is at least partially neutralized. Such neutralization is carried out before polymerization of an acrylic acid (in the state of a monomer), during the polymerization of the acrylic acid or after the polymerization of the acrylic acid (in the state of a hydrogel). From the viewpoint of improvement in productivity of the particulate water absorbing agent, improvement in AAP (fluid retention capacity under pressure) of the particulate water absorbing agent, and the like, the neutralization is carried out preferably before polymerization of an acrylic acid. In other words, it is preferable to use, as a monomer, neutralized acrylic acid (i.e., a partially neutralized salt of acrylic acid).

The neutralization is not particularly limited in neutralization rate. The neutralization rate, however, is in a range of preferably 10 mol % to 100 mol %, more preferably 30 mol % to 90 mol %, even more preferably 40 mol % to 80 mol %, and particularly preferably 50 mol % to 75 mol %, relative to an acid group. A neutralization rate of less than 10 mol % is not preferable. This is because at a neutralization rate of less than 10 mol %, a centrifuge retention capacity (CRC) may significantly decrease.

In a case where an acrylic acid (salt) is used as a main component in the present invention, a hydrophilic or hydrophobic unsaturated monomer(s) (hereinafter, referred to as "other monomer(s)") other than the acrylic acid (salt) can be used. Such other monomer(s) is not limited to any particular one. Examples of the other monomer(s) include methacrylic acid, (anhydrous) maleic acid, 2-(meth)acrylamide-2-methylpropanesulfonic acid, (meth) acryloxyalkanesulfonic acid, N-vinyl-2-pyrrolidone, N-vinylacetamide, (meth)acrylamide, N-isopropyl (meth)acrylamide, N,N-dimethyl (meth) acrylamide, 2-hydroxyethyl (meth)acrylate, methoxypolyethyleneglycol (meth)acrylate, polyethyleneglycol (meth) acrylate, stearylacrylate, salts thereof, and the like. In a case where the above other monomer(s) is used, the amount of the above other monomer(s) used is not limited to any particular amount as long as water absorption performance of a resultant water-absorbing resin is not impaired. The amount of the above other poly (s) used is in a range of preferably not more than 50 mol % and more preferably not more than 20 mol %, per a total amount of monomers. Note that in a case where the above other monomer(s) is used, a lower limit of the amount of the above other monomer(s) used is not particularly limited but is determined as appropriate in accordance with a type, a purpose and an effect of the other monomer(s), and that the lower limit of the amount of the above other monomer(s) used is approximately 1 weight % per the total amount of monomers.

(b) Neutralized Salt

As described above, in the present invention, it is preferable to use, as a monomer, a neutralized acrylic acid (i.e., partially neutralized salt of acrylic acid).

A basic substance to be used for the neutralization of an acrylic acid is not limited to any particular one. Examples of the basic substance include monovalent basic substances such as alkali metal hydroxides including sodium hydroxide, potassium hydroxide, and lithium hydroxide, carbonates (hydrogen carbonates) including sodium carbonate (sodium hydrogencarbonate) and potassium carbonate (potassium hydrogencarbonate), and the like. Among these, sodium hydroxide is particularly preferable.

Note that in regard to neutralization process conditions such as a temperature at the time of neutralization (neutralization temperature), preferably, the conditions disclosed in International Publication No. WO 2007/028751 and U.S. Pat. No. 6,388,000 are applied to the present invention.

(c) Crosslinking Agent (Internal Crosslinking Agent)

A crosslinking method in the present invention may be self-crosslinking which does not use any crosslinking agent in polymerization. It is, however, preferable to use a crosslinking agent (hereinafter, referred to also as "internal crosslinking agent"), from the viewpoint of water absorption performance of a resultant particulate water absorbing agent. The internal crosslinking agent usable in the present invention is not limited to a particular one. Examples of the internal crosslinking agent include a compound which includes at least two polymerizable double bonds per molecule (polymerizable crosslinking agent) and a multifunctional compound which includes, per molecule, two or more functional groups that are capable of reacting with a carboxyl group so as to form a covalent bonding (reactive crosslinking agent).

Specific examples of the polymerizable crosslinking agent include N,N'-methylene bisacrylamide, (poly)ethylene glycol di(meth)acrylate, (polyoxyethylene)trimethylolpropane tri(meth)acrylate, poly(meth)allyloxy alkane, and the like. Meanwhile, examples of the reactive crosslinking agent include: polyglycidyl ethers such as ethyleneglycoldiglycidyl ether; covalent bonding crosslinking agents such as polyhydric alcohols including propanediol, glycerine, sorbitol, and the like; and ionic bonding crosslinking agents such as polyvalent metal compounds including an aluminum salt and the like. Among these, from the viewpoint of water absorption performance, the internal crosslinking agent is preferably a polymerizable crosslinking agent that is polymerizable with an acrylic acid, and more preferably an acrylate-based, allyl-based or acrylamide-based polymerizable crosslinking agent. These internal crosslinking agents may be used singly or in combination of two or more.

From the viewpoint of physical properties, an amount of the internal crosslinking agent used is in a range of preferably 0.001 mol % to 5 mol %, more preferably 0.005 mol % to 2 mol %, even more preferably 0.01 mol % to 1 mol %, and particularly preferably 0.03 mol % to 0.5 mol %, relative to the monomers excluding the internal crosslinking agent.

(d) Other Component(s) in Aqueous Monomer Solution

In order to improve various physical properties of a particulate water absorbing agent that can be obtained by the present invention, one or more of the following substances can be added, as an optional component(s), to the aqueous monomer solution. In other words, it is possible to add a water-soluble resin or water-absorbing resin including starch, polyacrylic acid (salt), polyvinyl alcohol, polyethyleneimine, and the like, in an amount of preferably not more than 50 weight %, more preferably not more than 20 weight %, even more preferably not more than 10 weight %, and particularly preferably not more than 3 weight % relative to the monomers. Note that a lower limit of the amount of the above substances added is not particularly limited but is determined as appropriate in accordance with a type, a purpose and an effect of the substances, and that the amount of such substances added is preferably approximately 0.001 weight % relative to the monomers.

Further, it is possible to add, to the monomers, one or more of a foaming agent such as a carbonate, an azo compound or gas bubbles, a surfactant, a chelating agent, a hydroxycarboxylic acid, and a reducing inorganic salt as an additive(s) other than the above substances. These additive(s) can be added in an amount of preferably not more than 5 weight % and more preferably not more than 1 weight %, relative to the monomers. Note that though a lower limit of the amount of the additive(s) added is not particularly limited but is determined as appropriate in accordance with a type, a purpose and an effect of the additive(s), and that the amount of such an additive(s) added is preferably approximately 0.001 weight % relative to the monomers.

In a case where the additive(s) is added so as to prevent coloration with lapse of time of a particulate water absorbing agent and/or to improve urine resistance of a particulate water absorbing agent, preferably a chelating agent, a hydroxycarboxylic acid, or a reducing inorganic salt is used, and more preferably a chelating agent is used. In this case, an amount of the additive(s) added is in a range of preferably 10 ppm to 5000 ppm, more preferably 10 ppm to 1000 ppm, even more preferably 50 ppm to 1000 ppm, and particularly preferably 100 ppm to 1000 ppm, relative to monomers or a polymer thereof. With regard to the chelating agent, the hydroxycarboxylic acid, and the reducing inorganic salt, the compounds disclosed in Pamphlet of International Publication No. WO 2009/005114, and European Patent Nos. 2057228 and 1848758 can be used in the present invention.

(e) Polymerization Initiator

A polymerization initiator used in the polymerization step in accordance with the present invention is selected appropriately depending on a form of polymerization, and is not limited to any particular one. Examples of the polymerization initiator include pyrolysis-type polymerization initiators, photolytic-type polymerization initiators, redox-type polymerization initiators, and the like.

Specifically, examples of the pyrolysis-type polymerization initiators include: persulfates such as sodium persulfate, potassium persulfate, and ammonium persulfate; peroxides such as hydrogen peroxide, t-butyl peroxide, and methylethyl-ketone peroxide; azo compounds such as 2,2'-azobis(2-amidinopropane)dihydrochloride, and 2,2'-azobis[2-(2-imidazoline 2-yl)propane]dihydrochloride; and the like. Moreover, specific examples of the photolytic-type polymerization initiators include benzoin derivatives, benzyl derivatives, acetophenone derivatives, benzophenone derivatives, azo compounds, and the like. Further, specific examples of the redox-type polymerization initiators include systems that are a combination of a reducing compound such as L-ascorbic acid or sodium hydrogen sulfite with one or more of the persulfates and peroxides. Note that it is also possible to use one or more of the photolytic-type polymerization initiators and one or more of the pyrolysis-type polymerization initiators in combination.

The polymerization initiator is used in an amount in a range of preferably 0.0001 mol % to 1 mol % and more preferably 0.001 mol % to 0.5 mol %, relative to the monomers. In a case where the amount of the polymerization initiator used is more than 1 mol %, coloration of a resultant particulate water absorbing agent may occur. In contrast, in a case where the amount of the polymerization initiator used is less than 0.0001 mol %, residual monomers may increase. Therefore, the amount used of the polymerization initiator is preferably set within the above range.

The polymerization can be performed by, instead of using the polymerization initiator, irradiation with an active energy ray such as a radial ray, an electron ray, or an ultraviolet ray. Alternatively, the polymerization can be performed by using one or more of these active energy rays in combination with the polymerization initiator.

(f) Form of Polymerization

In the present invention, from the viewpoint of water absorption performance of a resultant particulate water absorbing agent, ease of control of polymerization, and the like, any of aqueous solution polymerization, reversed phase suspension polymerization, droplet polymerization in a vapor phase or droplet polymerization in an organic phase, and the like is used when the aqueous monomer solution is polymerized. Among these, forms of polymerization preferably employed are forms of polymerization, like reversed phase suspension polymerization, droplet polymerization in a vapor phase and droplet polymerization in an organic phase, in which particles of a resultant particulate water absorbing agent have a spherical shape, a shape close to a spherical shape, or a shape resulting from granulation of spherical particles. Note that while droplet polymerization in a vapor phase is referred to as "vapor phase droplet polymerization", droplet polymerization in an organic phase is referred to as "liquid phase droplet polymerization". Further, the "organic phase" means a "hydrophobic organic solvent phase", and typically, a saturated hydrocarbon such as n-heptane, cyclohexane, or the like is used in the "organic phase". This applies to the following descriptions.

The reversed phase suspension polymerization, the vapor phase droplet polymerization, and the liquid phase droplet polymerization are forms of polymerization in which droplets (normally, droplets having a diameter of not more than 1 mm) of the aqueous monomer solution is dispersed in a vapor phase or in an organic phase. These forms of polymerization allow for control of a particle diameter of a polymer obtained at the time of polymerization, so that no pulverizing step or crushing step is normally required (if necessary, pulverization and/or crushing can be carried out). Further, as described above, the particulate water absorbing agent obtained through polymerization in any of these forms of polymerization has a particle shape which is a spherical shape, a shape close to a spherical shape, or a shape resulting from granulation of particles having the spherical shape or the shape close to a spherical shape. Accordingly, in cases where such polymerization is carried out, a classification method in accordance with the present invention is suitably applied.

Specific examples of preferred embodiments of the aqueous solution polymerization encompass; belt polymerization disclosed in U.S. Pat. Nos. 4,893,999 and 6,241,928, U.S. Patent Application Publication No. 2005/0215734, and the like; and kneader polymerization disclosed in U.S. Pat. Nos. 6,987,151 and 6,710,141, and the like. Note that the aqueous solution polymerization can be arranged to be any of the following forms of polymerization: high-temperature-initiating polymerization in which a polymerization starting temperature is set to a temperature of preferably not lower than 30° C., more preferably not lower than 35° C., even more preferably not lower than 40° C., particularly preferably not lower than 50° C., and most preferably not lower than 60° C. (an upper limit is a boiling point); high-concentration polymerization in which a monomer concentration is set to a concentration of preferably not less than 35 weight %, more preferably not less than 40 weight %, and even more preferably not less than 45 weight % (an upper limit is a saturating concentration); and high-temperature-initiating and high-concentration polymerization in which the high-temperature-initiating polymerization and the high-concentration polymerization are combined. Note that the polymerization starting temperature is defined by a solution temperature of the aqueous monomer solution immediately before feeding of the aqueous monomer solution to a polymerization apparatus, and that conditions etc. disclosed in U.S. Pat. Nos. 6,906,159 and 7,091,253, and the like are applicable.

In preferred embodiments of the reversed phase suspension polymerization, conditions disclosed in U.S. Pat. No. 4,973,632, International Publication Nos. WO 2007/126002, and WO 2013/051417, and the like (e.g., hydrophobic organic solvent, surfactant, dropping a monomer(s), azeotropic dehydration, etc.) can be suitably applied to the present invention.

In preferred embodiments of the vapor phase droplet polymerization, conditions etc. disclosed in International Publication Nos. WO 2008/095901, WO 2009/027356, WO 2010/003855, WO 2010/003897, WO 2010/057912, WO 2011/023572, and WO 2011/026876, and the like can be suitably applied to the present invention.

In preferred embodiments of the liquid phase droplet polymerization, conditions etc. disclosed in International Application No. PCP/JP2015/084047 (International Filing Date: Dec. 3, 2015) and the like can be suitably applied to the present invention.

Further, from the viewpoint of improvement in physical properties of a resultant particulate water absorbing agent and drying efficiency, it is preferable to increase a solid content concentration of a hydrogel by vaporization of water during polymerization. That is, a degree of increase in solid content defined by (solid content of hydrogel after polymerization—solid content of monomers before polymerization) is set within a range of preferably not less than 1 weight %, more preferably 2 weight % to 40 weight %, and even more preferably 3 weight % to 30 weight %. Note that it is preferable to set an upper limit of the solid content of the hydrogel after polymerization to not more than 80 weight %.

Any of the above forms of polymerization can be carried out in an air atmosphere. It is, however, preferable from the viewpoint of prevention of coloration that the polymerization be carried out in an atmosphere of inert gas such as nitrogen or argon (with, for example, an oxygen concentration of not more than 1 volume %). Note that in a case where the reversed phase suspension polymerization or the liquid phase droplet polymerization is employed, an upper space of a reaction container should be put in an atmosphere of inert gas as necessary. It is further preferable that the polymerization be carried out after oxygen dissolved in a monomer(s) or in a solution containing a monomer(s) is substituted with inert gas (so that a dissolved oxygen concentration will be, for example, less than 1 mg/L). Further, the above forms of polymerization can be carried out under reduce pressure, under normal atmospheric pressure, or under increased pressure.

Furthermore, any of the above forms of polymerization is suitably applied to a large-scale production in which an amount of production per production line of the particulate water absorbing agent is large. The amount of production is preferably not less than 0.5 t/hr, more preferably not less than 1 t/hr, even more preferably not less than 5 t/hr, and even particularly preferably not less than 10 t/hr.

The polymerization step in accordance with the present invention can employ not only the aqueous solution polymerization or the reversed phase suspension polymerization but also any of vapor phase or organic phase spray polymerization and vapor phase or organic phase droplet polymerization which are well-known in the field of the present invention. Though a water-absorbing resin obtained in solution polymerization or continuous aqueous solution polymerization becomes unevenly-shaped particles, a water-absorbing resin obtained in the spray polymerization or the droplet polymerization becomes spherical particles or granulated materials thereof as in the case of the reversed phase suspension polymerization.

The shape of the particulate water absorbing agent which can be obtained in the reversed phase suspension polymerization or in the vapor phase or organic phase droplet polymerization becomes a spherical shape or a shape close to a spherical shape during polymerization, as described above. Accordingly, in some cases, gel-crushing after polymerization and pulverization after drying are unnecessary. Moreover, the particulate water absorbing agent which can be obtained through such a form of polymerization has a large bulk specific gravity and is compact. Such a particulate water absorbing agent therefore is excellent in impact resistance of powder of the particulate water absorbing agent. Note that the concept of "a spherical shape, or a shape close to a spherical shape" includes not only a perfect sphere but also a flattened sphere, an uneven-surface sphere, and an agglomerate.

As described above, the particulate water absorbing agent which can be obtained in the reversed phase suspension polymerization or the vapor phase or organic phase droplet polymerization has a spherical shape or a shape close to a spherical shape. A "sphericity (degree of sphericity)" defined in International Publication No. WO 2008/009580 is applied to the present invention, as an index indicative of a degree of perfection of a spherical shape of the particulate water absorbing agent.

In other words, the particulate water absorbing agent in accordance with the present invention has a sphericity (degree of sphericity) of preferably not less than. 0.80, more preferably not less than 0.84, even more preferably not less than 0.87, further still more preferably not less than 0.90, particularly preferably not less than 0.93, and most preferably not less than 0.96. Note that from the view point of the effect of the present invention, the classification method in accordance with the present invention can be suitably applied to particles of a spherical shape having the above sphericity or a granulated material thereof.

[2-2] Gel-Crushing Step (Optional)

This step is an optional step of obtaining a hydrogel in the form of particles (hereinafter, referred to as "particulate hydrogel") by gel-crushing the hydrogel obtained in the polymerization step.

The hydrogel obtained in the polymerization step can be directly subjected to drying, but may be subjected to gel-crushing as necessary so as to be a particulate hydrogel, during polymerization or after polymerization. In the gel-crushing, a gel crusher (kneader, meat chopper, cutter mill, or the like) is used.

In a case where the polymerization step is the reversed phase suspension polymerization, the vapor phase droplet polymerization, or the liquid phase droplet polymerization, the hydrogel obtained in any of these forms of polymerization already has a spherical shape or a shape close to a spherical shape. Accordingly, normally, the gel-crushing step is not required. Even in the case of any of the above forms of polymerization, however, gel-crushing may be carried out as necessary.

Note that in a preferred embodiment of such gel-crushing, conditions etc. disclosed in International Publication No. WO 2011/126078 etc. can be suitably applied to the present invention.

In addition, in a case where the polymerization step employs the reversed phase suspension polymerization or the liquid phase droplet polymerization, a step of separating an organic solvent from the hydrogel (separation step) can be carried out instead of the gel-crushing step since the hydrogel is in a dispersed state in the organic solvent.

[2-3] Drying Step

This is a step of drying the particulate hydrogel obtained in the polymerization step and/or the gel-crushing step or the separation step and thereby obtaining a dried polymer having a desired resin solid content. In the present invention, though the drying step and the polymerization step can be concurrently performed, it is preferable to separately perform the drying step after the polymerization step.

Note that the resin solid content is a value obtained from a drying loss (a change in weight in a case where 1 g of a sample is heated at 180° C. for 3 hours), and in the present invention, the resin solid content is in a range of preferably not less than 80 weight %, more preferably 85 weight % to 99 weight %, even more preferably 90 weight % to 98 weight %, and particularly preferably 92 weight % to 97 weight %. In a case where the resin solid content is less than 80 weight %, a fluid retention capacity per resin solid content decreases, the dried polymer aggregates, physical properties of a resultant particulate water absorbing agent deteriorates, and transportability deteriorates. Therefore, the resin solid content of less than 80 weight % is not preferable. In contrast, in a case where the resin solid content is more than 99 weight %, a longer drying time is required. In such a case, the particulate water absorbing agent deteriorates in powder characteristics (e.g., antistatic property, impact resistance, transportability, and the like). The resin solid content of more than 99 weight % is therefore not preferable.

Further, the resin solid content of the dried polymer substantially correspond to a resin solid content of the water-absorbing resin powder before surface-crosslinking or a resin solid content of the particulate water absorbing agent which is an end product.

A drying method of the particulate hydrogel in accordance with the present invention is not limited to a particular one. Examples of the drying method include drying by heating, hot air drying, drying under reduced pressure, drying with a fluidized bed, infrared drying, microwave drying, drying with a drum dryer, drying by azeotropic dehydration with a hydrophobic organic solvent (which is used particularly in the drying step in a case where a reversed phase suspension polymerization method has been used), high humidity drying with hot moisture vapor, and the like.

Further, a drying temperature in each of the above forms of drying is not particularly limited, and is selected as appropriate in a range of preferably 100° C. to 300° C. and more preferably 150° C. to 250° C.

In preferred embodiments of the drying step, conditions etc. disclosed in International Publication Nos. WO 2006/100300, WO 2011/025012, WO 2011/025013, and WO 2011/111657, and the like can be suitably applied to the present invention.

The dried polymer obtained through the drying step may contain particles (in the present invention, referred to as "undried material") having a large particle diameter diameter of not less than 1 cm) which is difficult to pulverize due to insufficient drying. In this case, the undried material may be classified and removed before the pulverizing step described below. The classification in accordance with the present invention can be applied to such classification of the undried material.

[2-4] Pulverizing Step (Optional)

This step is an optional step of pulverizing the dried polymer obtained in the drying step. Note that, in a case where the reversed phase suspension polymerization, the vapor phase droplet polymerization, or the organic phase droplet polymerization is used, the pulverizing step may not be necessary particularly. This is because in such a form of polymerization, a particulate hydrogel having a spherical shape or a shape close to a spherical shape can be obtained. In that case, the dried polymer is directly introduced into the classification step.

A pulverizer used in the pulverization step is not limited to any particular one. The pulverizer can be a conventionally known pulverizer. Specific examples of the pulverizer include: a roll mill, a hammer mill, a roll granulator, a jaw crusher, a gyratory crusher, a cone crusher, a roll crusher, and a cutter mill. Among these, a multiple-stage roll mill or a multiple-stage roll granulator is preferable, from the viewpoint of particle size control. Note that when a particulate hydrogel is dried, the particulate hydrogel may aggregate during drying and may consequently become a block-like aggregate. In this case, the aggregate should be subjected to rough crushing (operation to crush the aggregate into fragments) before pulverization of the particulate hydrogel.

Note that in preferred embodiments of the pulverizing step, conditions etc. disclosed Pamphlet of International Publication Nos. WO 2011/034146 (Patent Literature 14), WO 2011/034147 (Patent Literature 15), and the like can be suitably applied to the present invention.

[2-5] Classification Step

In the present invention, after the drying step, the classification step is carried out at least either or both of before and/or after the surface-crosslinking step (described below). Further, this classification step is characterized in that a hole shape of a classification sieve used in the classification step is irregular polygonal or non-circular.

The classification sieve having a hole shape of irregular polygons or non-circles is used in classification before surface-crosslinking or classification after surface-crosslinking, preferably either once or multiple times in the first, third and subsequent classifications on condition that classification is performed multiple times before or after surface-crosslinking, more preferably either once or multiple times in the first classification on condition that classification is performed multiple times before or after surface-crosslinking, and even more preferably in the first classification on condition that classification is performed multiple times after surface-crosslinking.

The production method in accordance with the present invention, unlike Patent Literature 16, does not require two classification operations after surface-crosslinking. In the production method in accordance with the present invention, it is possible to obtain a particulate water absorbing agent having excellent physical properties by only one classification operation before or after surface-crosslinking with use of a classification sieve having a hole shape of irregular polygons or non-circles.

The following describes in details the classification step in accordance with the present invention.

The classification step is a step which is carried out for the purpose of improving physical properties of the particulate water absorbing agent. That is, the classification step is a step of obtaining a water-absorbing resin having a specific particle size (weight average particle diameter (D50), particle diameter distribution, etc.). The classification step can be carried out either before or after the surface-crosslinking step described below but after the drying step. In other words, the classification step is carried out preferably at least either or both of before and/or after the surface-crosslinking step described below, more preferably after the surface-crosslinking step, and even more preferably both before and after the surface-crosslinking step.

Carrying out the classification step after the surface-crosslinking step makes it possible to prevent formation of particle aggregates at the time when surface-crosslinking agent is mixed or in heat treatment, and also makes it possible to prevent fine powder from being produced due to physical breaking, so that a particulate water absorbing agent having an excellent performance can be obtained. Therefore, having the classification step after the surface-crosslinking step is preferable.

For convenience, the water-absorbing resin supplied in the classification step is collectively called a "polymer subjected to classification". In other words, the polymer subjected to classification includes a non-surface-crosslinked water-absorbing resin obtained after the above-described drying step (or pulverizing step) and a surface-crosslinked water-absorbing resin.

Note that the particle size of the particulate water absorbing agent can be adjusted in any of the polymerization step (particularly, in the reversed phase suspension polymerization, the vapor phase droplet polymerization, or the organic phase droplet polymerization), the pulverizing step, a fine powder recycling step, a granulation step, and the like. However, from the view point of process simplicity etc., the particle size is preferably adjusted in the classification step.

In the classification step, in a case where sieve classification is performed by using a classification mesh whose openings have an irregular polygonal shape or a non-circular shape, the water absorption performance (in particular, fluid retention capacity under pressure (AAP), and moreover, liquid permeability (SFC and GBP)) of a resultant particulate water absorbing agent is improved. Further, it is possible to reduce deterioration in physical properties (particularly, fluid retention capacity under pressure (AAP)) during production which is continuously carried out for a long period of time.

Furthermore, in the classification step, coarse particles can be removed by using a classification sieve having a hole shape of irregular polygons or non-circles. Such removal of coarse particles is preferably performed by classifying the water-absorbing resin with use of the classification sieve having a hole shape of irregular polygons or non-circles, after drying step.

In addition, in the vapor phase or liquid phase droplet polymerization or the reversed phase suspension polymerization, an aqueous monomer solution is in the form of droplets and a particle diameter of the water-absorbing resin can be controlled by adjustment of the size of the droplets. This makes it possible to obtain spherical particles or a granulated material thereof after polymerization. In this case, excessively aggregated granulated material and/or coarse primary particles may be mixed in the spherical particles or the granulated material thereof. The production method of the present invention is preferably applied so as to remove such a material and/or particles mixed in the spherical particles or the granulated material thereof. In particular, in a case where spherical particles are a target material, the production method of the present invention is preferably applied so as to separate the spherical particles of a target particle size from the coarse particles and/or the primary particles having a size outside the target particle size, and to remove the coarse particles and/or the primary particles having a size outside the target particle size. Specifically, a water-absorbing resin obtained through the vapor phase or liquid phase droplet polymerization or the reversed phase suspension polymerization is subjected to surface-crosslinking after removal of the coarse particles or subjected to removal of the coarse particles after surface-crosslinking. This makes it possible to obtain a particulate water absorbing agent having a target particle size or in particular, a particulate water absorbing agent in the form of spherical particles or a granulated material thereof having a target particle size.

(Classification Sieve (Particularly, Classification Mesh))

In the method for producing a particulate water absorbing agent in accordance with the present invention, an oscillating classification apparatus (hereinafter, referred to as a "classification apparatus") is used in the classification step. The classification apparatus includes a sieve for adjusting the particle size of a resultant particulate water absorbing agent within a specific range. This "sieve" may be referred to also as a "classification sieve".

Further, the "classification mesh" as used herein means a mesh (hereinafter, referred to as a "sieve mesh") used in a sieve employed in the classification step of the present invention. Examples of the sieve mesh include not only meshes of mesh sieves of a plain weave, a twill weave, a herringbone twill weave, a crimp weave, a lock crimp weave, a flat top weave, a Ton-Cap weave (also known as a rectangular opening weave), a tie rod weave, a lend weave, a lozenge-pattern weave, a hexagonal pattern weave, a herringbone weave, a circular weave, and the like, but also meshes of plate sieves having a rectangular hole perforated mesh, an oval hole perforated mesh, and the like.

Note that the classification mesh employed in the present invention has openings that are a rectangular shape having a long side and a short side along two directions orthogonal to each other, or an oval shape (including an elliptical shape). Specifically, the present invention employs, as the classification mesh, an oblong-opening mesh such as meshes of a Ton-Cap weave, a tie rod weave, or the like.

Furthermore, the classification sieve is appropriately selected from among the mesh sieves with reference to JIS Z8801-1 (2000) etc., or from among the plate sieves with reference to JIS Z8801-2 (2000) etc. Further, it is possible to use a sieve defined by ASTM, TYLER or the like besides JIS. The sieves defined by such standards are called a standard sieve (hereinafter, the sieve defined by JIS is referred to as a "JIS standard sieve").

In addition, though the classification mesh used in the present invention can be a mesh sieve or plate sieve which is a metal mesh, a resin mesh, or the like, it is preferable that the classification mesh be a metal sieve having a metal mesh (metal mesh sieve). Note that metal wire diameters (e.g., vertical and horizontal wire diameters) of a sieve mesh plane (metal sieve mesh) may be identical or different and metal wire shapes (e.g., vertical and horizontal wire shapes) of the sieve mesh plane (metal sieve mesh) may be identical or different, and that the mesh is preferably a woven mesh made of a round metal wire and/or a flat metal wire. A material of the metal mesh (metal mesh sieve) is preferably stainless steel, and such a material can be coated with resin such as Teflon (registered trademark) as needed.

As shown in Examples (Table 1 to Table 3) described later and in FIG. 1, use of an oblong-opening metal mesh as a classification mesh results in improvement not only in fluid retention capacity under pressure (AAP) and total value of CRC and AAP of a resultant particulate water absorbing agent but also in liquid permeability (SFC) of the resultant particulate water absorbing agent. Further, in a case where the form of polymerization is the reversed phase suspension polymerization, or the vapor phase or liquid phase droplet polymerization, a resultant particulate water absorbing agent is a spherical particulate water absorbing agent or a granulated material thereof. Accordingly, though mesh openings of a conventional classification mesh were often clogged since the openings had a square shape, the production method in accordance with the present invention can reduce such clogging of openings of a classification mesh since an opening shape of the classification mesh (plate sieve or mesh sieve) employed in the present invention is irregular polygonal shape or non-circular. This makes it possible to improve production efficiency and classification efficiency.

(Mesh Size)

In regard to a mesh size of openings of the classification mesh employed in the present invention, both a major-axis length (x1) and a minor-axis length (x2) of the openings need to be in a range of preferably 10 μm to 100 mm, and more preferably 20 μm to 10 mm. From the viewpoint of physical properties of a resultant particulate water absorbing agent, however, the upper limit of the minor-axis length (x2) of the openings is preferably 600 μm to 1000 μm, and specifically, appropriately selected from among 600 μm, 710 μm, 850 μm, 1000 μm, and the like. Meanwhile, the lower limit of the minor-axis length (x2) of the openings is preferably 45 μm to 300 μm (more preferably 106 μm to 200 μm), and specifically appropriately selected from among 45 μm, 75 μm, 106 μm, 150 μm, 175 μm, 212 μm, 250 μm, 300 μm, and the like.

Further, the number of the classification mesh(es) provided in one classification apparatus may be one or not less than two. In a case where a single classification mesh is provided in one classification apparatus, the minor-axis length of openings should be selected so as to be within the range between the above upper and lower limits, in accordance with an application or a purpose of the particulate water absorbing agent. Furthermore, in a case where two classification meshes are provided in one classification apparatus, the minor-axis length of openings of one classification mesh and the minor-axis length of openings of another classification mesh should be appropriately selected so as to be the above upper and lower limits, respectively. In a case where not less than three classification meshes are provided in one classification apparatus, a classification mesh(es)

having a minor-axis length of openings within the range between the above upper and lower limits should be added as appropriate. If necessary, classified materials can be mixed again after classification.

Moreover, in a case where not less than two classification meshes are used, two or more of the not less than two classification meshes can have substantially equal mesh sizes. For example, in a case where three classification meshes in total are used and the three classification meshes include a classification mesh whose minor-axis length (x2) of openings is 850 µm and a classification mesh whose minor-axis length (x2) of openings is 150 µm, it is possible to employ a so-called double screen like a screen having any of the following combinations of the above classification meshes: (1) a combination of two classification meshes whose minor-axis length (x2) is 850 µm and one classification mesh whose minor-axis length (x2) is 150 µm; and (2) a combination of one classification mesh whose minor-axis length (x2) is 850 µm and two classification meshes whose minor-axis length (x2) is 150 µm. Note that in a case where three or more classification meshes are used and classification is carried out by using classification meshes having mesh sizes of the above upper and lower limits, respectively, another classification mesh having an intermediate mesh size (e.g., 450 µm) between 150 µm and 850 µm can be additionally used for the purpose of improvement of classification efficiency and the like.

An oblong-opening metal mesh can be arranged, like a tie rod weave mesh, such that a ratio of a major-axis length (x1) (a length along a lengthwise direction) to a minor-axis length (x2) (a length along a widthwise direction) (the ratio defined by "major-axis length (x1)/minor-axis length (x2)") is not less than 10, but preferably in a range of 1.2 to 10, more preferably in a range of 1.3 to 5, and even more preferably in a range of 1.4 to 4. Note that in the case of a Ton-Cap weave metal mesh used in Examples of the present invention, the ratio (x1/x2) is in a range of 2.5 to 3.5.

The classification mesh used in classification in accordance with the present invention must have mesh openings whose shape is irregular polygonal or non-circular. However, in a case where two or more classification meshes are used or in a case where two or more classification steps are performed (e.g., classification in steps before and after surface-crosslinking, classification in two or more steps before surface-crosslinking, and the like), not all the classification meshes need to have mesh openings whose shape is irregular polygonal or non-circular. In such a case, it is possible to use a plate sieve (JIS Z8801-2(2000)) or mesh sieve (JIS Z8801-1(2000)) whose mesh opening shape is square or circular.

(Classification Aid)

At least either or both of before and/or after the classification step in accordance with the present invention, a classification aid which is not a water-absorbing resin may be added. The classification aid is not limited to any particular one. The classification aid can be inorganic fine particles or organic fine particles having a specific gravity which is larger than that of a polymer subjected to classification. The classification aid is preferably inorganic fine particles, and more preferably water-insoluble inorganic fine particles. In a case where the classification aid is added before the classification step, the classification aid is mixed at the time when the polymer subjected to classification is classified. Then, after classification (particularly, sieve classification), the water-absorbing resin fine powder and the classification aid in a mixed state are removed. The water-absorbing resin fine powder and the classification aid which have been classified and removed can be recycled, after separated if necessary.

Further, the classification aid improves classification efficiency by coating the surface of the water-absorbing resin. It is also possible to improve water absorption performance (e.g., liquid permeability and anti-caking property) by leaving the classification aid (particularly, water-insoluble inorganic fine particles) on the surface of the water-absorbing resin.

From the viewpoint of classification efficiency, the specific gravity of the classification aid used in the present invention is preferably larger than that of a polymer subjected to classification (approximately 1.6 $g/cm^3$ in a case where the polymer is sodium polyacrylate), normally not less than 2 $g/cm^3$, more preferably 2.0 $g/cm^3$ to 4.0 $g/cm^3$, even more preferably 2.3 $g/cm^3$ to 3.5 $g/cm^3$, and particularly preferably 2.5 $g/cm^3$ to 3.0 $g/cm^3$. Further, an apparent specific gravity (bulk specific gravity) of the classification aid is preferably not less than 0.5 $g/cm^3$.

The inorganic fine particles to be used, particularly, water-insoluble fine particles to be used are preferably powder of a water-insoluble polyvalent metal salt, a hydroxide, or an oxide, and more preferably powder of a water-insoluble polyvalent metal salt. Examples of the water-insoluble polyvalent metal salt include a calcium salt and an aluminum salt, and powders of calcium carbonate (2.711 $g/cm^3$ (calcite), 2.93 $g/cm^3$), calcium sulfate (2.96 $g/cm^3$ (anhydride), 2.32 $g/cm^3$ (dihydrate)), calcium oxide (3.35 $g/cm^3$) and the like are used as the inorganic fine particles.

In the present invention, the classification aid is removed together with the water-absorbing resin fine powder (preferably not less than 10 weight %, not less than 30 weight %, not less than 50 weight %, and not less than 70 weight % in the ascending order of preference, and particularly preferably not less than 90 weight % of the classification aid added) so as to improve classification efficiency of the polymer subjected to classification and/or liquid permeability of the particulate water absorbing agent as a resultant product. Note that a ratio of the classification aid in a mixture of the classification aid and the water-absorbing resin fine powder is measured by appropriately employing a measurement method in accordance with a classification aid used.

(Stretch Tension (Tension))

The stretch tension (tension) of the classification mesh used in the present invention is preferably not less than 35 N/cm, more preferably not less than 40 N/cm, even more preferably not less than 45 N/cm, and particularly preferably not less than 50 N/cm. Further, an upper limit of the tension is preferably not more than 100 N/cm, more preferably not more than 80 N/cm, and even more preferably not more than 60 N/cm.

In a case where the stretch tension (tension) is not less than 35 N/cm, classification efficiency of the polymer subjected to classification can be prevented from deteriorating, so that water absorption performance of a resultant particulate water absorbing agent improves.

Meanwhile, in a case where the stretch tension (tension) is not more than 100 N/cm, it is possible to ensure durability of the metal sieve mesh. This allows for continuous production operation.

The contents disclosed in International Publication No. WO 2011/115221 (Patent Literature 2) etc. are applied to the stretch tension (tension) in the present invention.

(Guide)

The classification mesh used in the present invention is preferably provided with a guide for efficient classification of the polymer subjected to classification. Such provision of a guide makes it possible to efficiently classify the polymer subjected to classification. The guide functions to guide the polymer subjected to classification to a center portion of the classification mesh, and the like. A length of the guide is appropriately set within a range of 5% to 40% of a diameter of the classification mesh.

(Classification Conditions)

In the classification step in the method for producing a particulate water absorbing agent in accordance with the present invention, the opening shape of the above-described classification mesh only needs to be irregular polygonal or non-circular. In regard to other classification conditions, conditions of a well-known method are applied to the present invention.

More specifically, in regard to a tapping material and a classification aid used for increasing classification efficiency, an air brush for preventing clogging of a classification mesh, monitoring of breakage of a classification mesh, and the like, the contents disclosed in International Publication Nos. WO 2011/115216 (Patent Literature 3) and WO 2011/115221 (Patent Literature 2) are applied to the present invention.

Further, in regard to properties of a material and surface roughness of a classification apparatus including a classification mesh, classification with removal of electricity, an atmospheric dew point, a degree of depressurization, etc., the contents below disclosed in international Publication No. WO 2014/021432 (Patent Literature 4) etc. are applied to the present invention.

In the present invention, a temperature difference ($\Delta T$) between the classification apparatus (particularly, the classification sieve) and the polymer subjected to classification (water-absorbing resin) fed to the classification apparatus is adjusted so as to be preferably not more than 20° C. and more preferably not more than 10° C. Note that from the viewpoint of fluidity of the polymer subjected to classification, the polymer subjected to classification is heated to preferably not less than room temperature (20° C. to 25° C.), more preferably 40° C. to 100° C., and even more preferably 50° C. to 80° C. in a case where the particulate water-absorbing agent in accordance with the present invention is produced on an industrial scale. The polymer subjected to classification may be externally heated to a predetermined temperature. Alternatively, the temperature of the polymer subjected to classification may be controlled within the above temperature range, by cooling or keeping, to/at the predetermined temperature, the water-absorbing resin which have undergone drying by heating or heat treatment in the drying step or the surface-crosslinking step and heated to a temperature in the above temperature range.

Further, the atmospheric dew point (particularly, dew point of the airflow inside the sieve) (during classification is not particularly limited, and is preferably not more than 40° C., more preferably not more than 20° C., even more preferably not more than 15° C., particularly preferably not more than 10° C., and particularly preferably not more than 0° C. Further, the temperature inside the classification apparatus or the temperature of the classification sieve is preferably 40° C. to 120° C., more preferably 50° C. to 110° C., even more preferably 60° C. to 100° C., particularly preferably 65° C. to 90° C., and most preferably 70° C. to 80° C.

(Classification Apparatus)

The classification apparatus employed in the present invention is preferably an oscillating sieve classification apparatus having a locus described below. The oscillating sieve classification apparatus is not limited to a particular one as long as the oscillating sieve classification apparatus can control a three-dimensional motion of the sieve mesh (the surface of the sieve mesh spirally oscillates) is controlled on the basis of a combination of a radial gradient R, a tangential gradient T, and an eccentric gradient E of a locus and a rotation number F. Note that the radial gradient R, the tangential gradient T, and the eccentric gradient E of the locus of the oscillating sieve classification apparatus are measured according to the method disclosed in International Publication No. WO 2014/021432 (Patent Literature 4).

The radial gradient R is preferably 5 mm to 40 min, more preferably 5 mm to 20 mm, and even more preferably 5 mm to 15 mm. In a case where the radial gradient R is less than 5 mm, a residence time of a sample on the sieve mesh becomes longer. This increases a load on the sieve mesh and may result in a shorter lifetime of the sieve mesh. On the other hand, in a case where the radial gradient R is more than 40 mm, the sample tends to move to a peripheral portion of the sieve mesh and may excessively increases a discharge rate. This may result in deterioration of classification efficiency. The radial gradient R can be adjusted by a weight which causes the classification apparatus to oscillate.

The tangential gradient T is preferably 0.1 mm to 25 mm, more preferably 2 mm to 20 mm, and even more preferably 4 mm to 15 mm. In a case where the tangential gradient T is less than 0.1 mm, the sample less "jumps" on the sieve mesh. This may decrease classification efficiency. On the other hand, in a case where the tangential gradient T is more than 25 mm, the sample tends to concentrate in a central portion of the sieve mesh. This may result in difficulty in discharge of the sample. Note that the tangential gradient T can be adjusted by an adjustment bolt or the like of the classification apparatus.

The eccentric gradient E is preferably 40 mm to 80 mm, more preferably 50 mm to 80 mm, and even more preferably 50 mm to 70 mm. In a case where the eccentric gradient E is less than 40 mm, the classification efficiency may decrease. On the other hand, in a case where the eccentric gradient E is more than 80 mm, the sample tends to remain on the sieve mesh may pass through the sieve mesh or the classification apparatus may be broken down. Note that the eccentric gradient E can be adjusted by a weight which causes sieve-surface rotation to be eccentric rotation in the classification apparatus.

The rotation number F is preferably 60 rpm to 600 rpm, more preferably 100 rpm to 500 rpm, and even more preferably 150 rpm to 400 rpm. In a case where the rotation number F is less than 60 rpm, the classification efficiency may decrease. On the other hand, in a case where the rotation number F is more than 600 rpm, the sample on the sieve mesh may be damaged or the sieve mesh may be easily broken.

Further, other than the oscillating sieve classification apparatus, it is possible to employ, as the classification apparatus, any of a vibrating screen (a device providing a vibration component perpendicular to a sieve surface), a shifter (a device which can disregard a vibration component in a vertical direction), and the like which are classification machines for providing oscillation to a classification sieve.

Further, the classification apparatus may have a sieve surface which is horizontal or tilted. In a case where the classification apparatus employed has a tilted sieve surface, an oscillation direction should be made to coincide with either a major-axis direction of openings of the classification mesh or a minor-axis direction of openings of the classification mesh. From the viewpoint of the object to be solved by the present invention, it is preferable that the classification sieve be vibrated in the major-axis direction of openings of the classification mesh. Note that in regard to a form of oscillation of the classification apparatus, for example, the contents disclosed on pages 529 to 530, FIGS. 2.22 and 2.23 of Powder Technology Handbook (First Edition; Nikkan Kogyo Shinbun, Ltd.) is applied to the present invention, (Temperature of Classification Apparatus)

In the present invention, it is preferable to use the classification apparatus in a heated state and/or in a state in which the temperature of the classification apparatus is kept. The classification apparatus may be put in such a state by increasing an atmospheric temperature of the place where the classification apparatus is located, coating the classification apparatus with a heat insulating material, or the like. Note that the temperature of the classification apparatus (the temperature of the sieve mesh) is preferably 40° C. to 80° C. and more preferably 45° C. to 60° C. In a case where the temperature of the classification apparatus is not less than 40° C., deterioration in physical properties of a resultant particulate water absorbing agent is prevented. Therefore, the temperature of the classification apparatus is preferably not less than 40° C. On the other hand, in a case where the temperature of the classification apparatus is not more than 80° C., classification efficiency does not deteriorate. Therefore, the temperature of the classification apparatus is preferably not more than 80° C.

(Physical Properties of Polymer Subjected to Classification Before Classification)

In order to obtain the effect of the present invention, the polymer subjected to classification that is supplied in the classification step, preferably has the following physical properties.

That is, a fluid retention capacity under pressure (AAP 0.7 psi) of the polymer subjected to classification is preferably not less than 10 g/g, more preferably not less than 15 g/g, even more preferably not less than 20 g/g, particularly preferably not less than 22 g/g, and most preferably not less than 24 g/g. An upper limit value of the AAP 0.7 psi is not particularly limited. From the viewpoint of the balance between the AAP 0.7 psi and other physical properties, the upper limit value of the AAP 0.7 psi is preferably not more than 40 g/g. When the AAP 0.7 psi is set within the above range, the particulate water absorbing agent is preferably applied to an absorbent body of an absorbent article such as disposable diapers. Meanwhile, an AAP 0.3 psi of the polymer subjected to classification is preferably not less than 20 g/g, more preferably not less than 24 g/g, and even more preferably not less than 28 g/g (an upper limit is approximately 45 g/g).

Further, a bulk specific gravity of the polymer subjected to classification is preferably not less than 0.50 g/cm$^3$, and more preferably in a range of 0.60 g/cm$^3$ to 0.80 g/cm$^3$. When the bulk specific gravity is set in the above range, the particulate water absorbing agent during production of absorbent articles such as disposable diapers can be excellent in handleability. Therefore, the bulk specific gravity in the above range is preferable.

In addition, not less than 50 weight % of the polymer subjected to classification has a particle diameter of preferably less than 600 μm, more preferably less than 500 μm, and even more preferably less than 400 μm. Such a particle size allows the water-absorbing resin powder before surface-crosslinking, the water-absorbing resin particles after surface-crosslinking, and an end product (particulate water absorbing agent) to have a desired particle size. Therefore, the above particle size is preferable.

(Particle Size of Water-Absorbing Resin Powder after Classification)

From the viewpoint of improvement in physical properties of the particulate water absorbing agent in accordance with the present invention, the water-absorbing resin powder after classification (before surface-crosslinking) is preferably controlled to have the following particle size.

That is, a weight average particle diameter (D50) of the water-absorbing resin powder (before surface-crosslinking) is in a range of preferably 200 μm to 600 μm, more preferably 200 μm to 550 μm, even more preferably 250 μm to 500 μm, and particularly preferably 300 μm to 450 μm.

Moreover, a ratio of particles having a particle diameter of less than 150 μm (hereinafter, which may be referred to also as "fine powder") in the water-absorbing resin powder (before surface-crosslinking) is preferably not more than 5 weight %, more preferably not more than 3 weight %, and even more preferably not more than 1 weight %, relative to all the water-absorbing resin powder.

Further, a ratio of particles having a particle diameter of not less than 850 μm (which may hereinafter be also referred to as "coarse particles") in the water-absorbing resin powder (before surface-crosslinking) is preferably not more than 5 weight %, more preferably not more than 3 weight %, and even more preferably not more than 1 weight %, relative to all the water-absorbing resin powder.

Furthermore, a ratio of particles having a particle diameter of not less than 150 μm and less than 850 μm in the water-absorbing resin powder (before surface-crosslinking) is preferably not less than 95 weight % and more preferably not less than 98 weight %, relative to all the water-absorbing resin powder. An upper limit of the ratio is 100 weight %.

In addition, a logarithmic standard deviation (σζ) of particle size distribution of the water-absorbing resin powder (before surface-crosslinking) is preferably in a range of 0.20 to 0.40, more preferably in a range of 0.25 to 0.39, and even more preferably in a range of 0.27 to 0.38.

Again, in the present invention, it is preferable that the water-absorbing resin powder having the above particle size be surface-crosslinked, and the same particle size as above is applied to the water-absorbing resin particles after surface-crosslinking and the particulate water absorbing agent as an end product. In other words, in order to obtain the water-absorbing resin powder, the water-absorbing resin particles and the particulate water absorbing agent which have the above particle size, the classification step must be carried out either before or after the surface-crosslinking step but after the drying step. Note that it is preferable that the classification step be carried out both before and after the surface-crosslinking step. In a case where the classification step is carried out both before and after the surface-crosslinking step, the classification sieve having a hole shape of irregular polygons or non-circles is used at least in one classification step before or after the surface-crosslinking step and preferably in both classification steps before and after the surface-crosslinking step.

The above-described particle size is measured by using a JIS standard sieve, according to methods described in EDANA ERT 420.2-02 ("PSD") and International Publication No. WO 2004/069915.

(Yield)

The term "yield" is defined as a ratio of a resultant water-absorbing resin (water-absorbing resin powder or particulate water absorbing agent) with respect to a polymer subjected to classification. In the classification step of the present invention, this yield is preferably not less than 75 weight %, more preferably not less than 77 weight %, and even more preferably not less than 80 weight %. The yield in the above range is preferable since such a yield results in improvement of productivity.

(Classification of Commercially Available Product)

The present invention employs a classification sieve having openings that are non-polygonal or non-circular in classification at least either or both of before and/or after surface-crosslinking. In one embodiment of classification after surface-crosslinking, a commercially available surface-crosslinked water-absorbing resin may be an object subjected to classification. The present invention is applicable to particle size adjustment and improvement in physical properties of a commercially available surface-crosslinked water-absorbing resin. The production method in accordance with the present invention encompasses a method for such classification.

Note that a surface-crosslinking state of a commercially available water-absorbing resin can be checked by the following method. First, as disclosed in FIGS. 1 to 3 of International Publication No. WO 2014/041969 (Patent Literature 37), a crack in a surface-crosslinked layer in a swollen state can be observed in a microscope photograph. Other than the above, it is possible to check the surface-crosslinking state by finding that a high AAP value like 36 g/g is exhibited (AAP is approximately 10 g/g or not more than 10 g/g in a state where a water-absorbing resin is not surface-crosslinked). In addition, it is also possible to check the surface-crosslinking state on the basis of a residual surface-crosslinking agent, a change caused by surface-crosslinking in water absorbent property at each particle size of a water-absorbing resin, microscopic IR analysis of a surface of a water-absorbing resin, and the like.

(Comparison with Prior Literatures)

Neither Patent Literatures 1 to 15 (measures to improve productivity and measures to improve performance by classification of a water-absorbing resin) nor Patent Literatures 17 to 37 (measures to improve performance of a water-absorbing resin with the focus on matters other than classification) disclose classification of a water-absorbing resin by use of a "classification sieve having a hole shape of irregular polygons or non-circles" of the present invention.

Moreover, Patent Literature 16 (unpublished prior application) discloses a production method intended to improve a gel elastic modulus index (EMI). According to this production method, a water-absorbing resin after surface-crosslinking is subjected to first classification with use of at least two kinds of sieves having mesh sizes of 150 µm to 850 µm, respectively, and then, further subjected to second classification with use of a sieve mesh having a specific rectangular mesh opening. In other words, Patent Literature 16 discloses that the classification step after surface-crosslinking is performed two times, and in the second classification step, a sieve mesh (a so-called Ton-Cap sieve) having a rectangular mesh opening is used (see paragraphs [0117] to [0132], and Example 1 of Patent Literature 16).

On the other hand, the presentation discloses that on condition that classification is performed multiple before or after surface-crosslinking, a "classification sieve having a hole shape of irregular polygons or non-circles" is used either once or multiple times in the first, third and subsequent classifications so as to obtain a target particle size. The classification in accordance with the present invention makes it possible to achieve improvement of classification efficiency and also to achieve improvement of performance including a fluid retention capacity under pressure (AAP), a liquid permeability (e.g., SFC), and the like.

The first classification to a target particle size, on condition that classification is performed multiple times after surface-crosslinking, indicates not removal of an aggregate disclosed in Patent Literature 16 but classification intended to adjust the particle size to a product particle size. In other words, the present invention can be directed to a water-absorbing resin other than that disclosed in Patent Literature 16 (unpublished prior application), and is preferably directed to a water-absorbing resin other than the water-absorbing resin disclosed in paragraph [0117] and Example 1 of Patent Literature 16. Note that the water-absorbing resin disclosed in paragraph [0117] and Example 1 of Patent Literature 16 is a water-absorbing resin remaining on a sieve which is used to classify a surface-crosslinked water-absorbing resin and has a smallest mesh size out of at least two kinds of sieves that are used for classification, each of which has a mesh size ranging from not less than 150 µm to not more than 850 µm. Therefore, the water-absorbing resin disclosed in Patent Literature 16 is not an object subjected to classification in accordance with the present invention.

[2-6] Surface-Crosslinking Step

This step is a step of providing a portion where a crosslinking density is higher in a surface layer of a water-absorbing resin powder obtained through the above described steps. The surface-crosslinking step is constituted by a mixing step and a heat treatment step, and a cooling step (optional). In the surface-crosslinking step, a water-absorbing resin powder (hereinafter, referred to as "water-absorbing resin particles") can be obtained which has been surface-crosslinked by radical crosslinking on the surface of the water-absorbing resin powder, surface polymerization on the surface of the water-absorbing resin powder, cross-linking reaction with a surface-crosslinking agent, or the like.

(Surface-Crosslinking Agent)

A surface-crosslinking agent used in the present invention is not limited to a particular one. Examples of the surface-crosslinking agent include an organic surface-crosslinking agent and an inorganic surface-crosslinking agent. Among others, an organic surface-crosslinking agent (dehydrating and condensing surface-crosslinking agent) that is reactive with a carboxyl group is preferable, from the viewpoint of physical properties of a particulate water absorbing agent and handleability of the surface-crosslinking agent. For example, one of the surface-crosslinking agents disclosed in U.S. Pat. No. 7,183,456 can be used, or two or more of the surface-crosslinking agents disclosed in U.S. Pat. No. 7,183,456 can be used. Specifically, examples of the surface-crosslinking agent encompass a polyhydric alcohol compound, an epoxy compound, a haloepoxy compound, a polyamine compound, a condensed product with a haloepoxy compound of the polyamine compound, an oxazoline compound, an oxazolidinone compound, a polyvalent metal salt, an alkylene carbonate compound, a cyclic urea compound, and the like. Among others, from the viewpoint of the effect of the present invention, it is preferable to use at least one dehydration esterification surface-crosslinking agent selected from among a polyhydric alcohol compound, an alkylene carbonate compound, and an oxazolidinone compound. An amount of such an organic surface-crosslinking agent used (or a total amount used in a case where a plurality of surface-crosslinking agents are used) is preferably in a range of 0.001 parts by weight to 10 parts by weight, and more preferably in a range of 0.01 parts by weight to 5 parts by weight, relative to 100 parts by weight of the water-absorbing resin powder.

The surface-crosslinking agent is preferably added in the form of an aqueous solution to the water-absorbing resin powder. In this case, an amount of water used is preferably in a range of 0.1 parts by weight to 20 parts by weight, and more preferably in a range of 0.5 parts by weight to 10 parts by weight, relative to 100 parts by weight of the water-absorbing resin powder. Further, a hydrophilic organic solvent may be used in combination as needed. In this case, an amount of the hydrophilic organic solvent used is preferably not more than 10 parts by weight, and more preferably not more than 5 parts by weight, relative to 100 parts by weight of the water-absorbing resin powder. Note that the hydrophilic organic solvent can be one or a combination of two or more selected as appropriate from among lower alcohols, ketones, ethers, polyhydric alcohols, and the like.

Further, additives to be added in the "addition step" described below can be each mixed with the surface-crosslinking agent (aqueous solution) in an amount in a range of not more than 5 parts by weight and then added together with the surface-crosslinking agent. Alternatively, separately from the surface-crosslinking agent, the additives can be added in the following mixing step.

(Mixing Step)

This step is a step of mixing the water-absorbing resin powder and the surface-crosslinking agent and thereby obtaining a humidified mixture. A method of mixing the water-absorbing resin powder and the surface-crosslinking agent is not limited to a particular one and can be, for example, a method in which a surface-crosslinking agent solution is prepared in advance, and the surface-crosslinking agent solution is mixed with the water-absorbing resin powder preferably by spraying or dropping the surface-crosslinking agent solution onto the water-absorbing resin powder, and more preferably by spraying the surface-crosslinking agent solution onto the water-absorbing resin powder.

An apparatus for the above mixing is not limited to a particular one. The apparatus is preferably a high-speed stirring mixer, and more preferably a high-speed stirring continuous mixer. Alternatively, in a case where the water-absorbing resin powder is subjected to polymerization in a hydrophobic organic solvent, such as reversed phase suspension polymerization, or in a case where the water-absorbing resin powder polymerized in the hydrophobic organic solvent is further dried, the water-absorbing resin powder may be surface-crosslinked by adding the surface-crosslinking agent to the hydrophobic organic solvent.

(Heat Treatment Step)

This step is a step of heating the humidified mixture, which has been obtained in the mixing step, so as to cause cross-linking reaction on a surface of the water-absorbing resin powder.

An apparatus for performing the cross-linking reaction is not limited to a particular one and can be preferably a paddle dryer. When the reversed phase suspension polymerization method is used, the surface-crosslinking may be performed by continuing use of the apparatus used for polymerization and/or drying.

A heating temperature in heat treatment during the cross-linking reaction is decided as appropriate depending on a type of the surface-crosslinking agent in use. The heating temperature is preferably in a range of 70° C. to 300° C., more preferably in a range of 120° C. to 250° C., and even more preferably in a range of 150'C to 250'C. Further, a heating time in the heat treatment is preferably in a range of 1 minute to 2 hours.

(Cooling Step)

This step is an optional step which is carried out after the heat treatment step if needed. In this step, the mixture having undergone the heat treatment is forcibly cooled to a predetermined temperature.

An apparatus for performing the cooling is not limited to a particular one and is preferably an apparatus whose specification is identical with that of an apparatus used in the heat treatment step, and more preferably a paddle dryer. This is because such an apparatus can be used as a cooling apparatus by changing a heating medium to a cooling medium. Note that in this cooling step, the mixture having undergone the heat treatment is forcibly cooled as needed to a temperature in a range of preferably 40° C. to 80° C., and more preferably 50° C. to 70° C. Note that in a case where the classification step (which may be also referred to as "sizing step") is performed after the cooling step, the cooling is preferably performed so as to satisfy the conditions described above in the classification step. Also, note that for convenience, the mixture having undergone the surface-crosslinking (heat treatment), that is, surface-crosslinked water-absorbing resin powder is referred to as "water-absorbing resin particles".

[2-7] Addition Step

This step is an optional step which is carried out so as to impart various additional functions to the particulate water absorbing agent that is an end product and also to improve water absorption performance of the particulate water absorbing agent. The addition step is a step of adding an additive(s) to the water-absorbing resin particles obtained as a result of the surface-crosslinking step. This addition of the additive(s) is performed concurrently with the surface-crosslinking step or separately from the surface-crosslinking step.

Examples of the additive(s) include water, a chelating agent such as an amino polyvalent carboxylic acid, an organic reducing agent, an inorganic reducing agent, an oxidizer, a hydroxycarboxylic acid compound, a surfactant, a compound having a phosphorus atom, organic powder such as metallic soap, a water-soluble polymer such as polyethyleneglycol, a deodorant agent, an antibacterial agent, pulp, thermoplastic fibers, and the like.

Note that addition of water improves impact resistance of the particulate water absorbing agent and a water absorption speed of the particulate water absorbing agent. The moisture content of the particulate water absorbing agent is in a range obtained from the resin solid content described in the above [2-3] drying step (moisture content 100-resin solid content; unit: weight %). Further, another example of the water absorption performance is liquid permeability. Examples of the additive to improve the liquid permeability include a polyvalent metal salt (described below), a cationic polymer (described below), inorganic fine particles (described below), and the like, and at least one of these is used.

(Polyvalent Metal Salt)

The polyvalent metal that can be used in the present invention is preferably aluminum, zirconium, or the like. Further, the polyvalent metal salt that can be used in the present invention is preferably aluminum lactate or aluminum sulfate, and more preferably aluminum sulfate.

An amount of the polyvalent metal salt added is specified by an amount of a metal cation of the polyvalent metal salt added, and the amount of the metal cation is preferably less than 3.6×10 mol, more preferably less than $2.8 \times 10^{-5}$ mol, and even more preferably less than $2.0 \times 10^{-5}$ mol, relative to 1 g of the water-absorbing resin particles.

(Cationic Polymer)

The cationic polymer that can be used in the present invention is preferably any of the compounds disclosed as examples in U.S. Pat. No. 7,098,284 and the like, and among others, particularly preferably a vinyl amine polymer.

An amount of the cationic polymer added is preferably less than 2.5 weight %, more preferably less than 2.0 weight %, and even more preferably less than 1.0 weight %, relative to 100 parts by weight of the water-absorbing resin particles.

(Inorganic Fine Particles)

The inorganic fine particles that can be used in the present invention are preferably particles made of any of compounds disclosed as examples in U.S. Pat. No. 7,638,570 and the like, and particularly preferably particles made of silicon dioxide.

An amount of the inorganic fine particles added is preferably less than 2.0 weight %, more preferably less than 1.5 weight %, and even more preferably less than 1.0 weight %, relative to 100 parts by weight of the water-absorbing resin particles.

[2-8] Other Steps

In addition to the above described steps, it is possible to carry out a fine powder recycle step, a granulation step, a fine powder removal step, an iron removal step, and the like according ed. Moreover, it is possible to further carry out one or more of a transportation step, a storing step, a packing step, and the like.

[3] Physical Properties of Particulate Water Absorbing Agent

The particulate water absorbing agent obtained by the production method in accordance with the present invention is a particulate water absorbing agent containing, as a main component, a polyacrylic acid (salt)-based water-absorbing resin which is obtained through the above described polymerization step and surface-crosslinking step, and the like. In a case where the particulate water absorbing agent is used in an absorbent body of absorbent articles such as disposable diapers, it is desirable to control preferably at least one of the physical properties described in the following [3-1] to [3-4]; more preferably not less than two of the physical properties, including the AAP, of [3-1] to [3-4]; even more preferably not less than three of the physical properties, including the AAP, of [3-1] to [3-4]; and particularly preferably all four of the physical properties, such that the physical properties each fall within the following range.

[3-1] Centrifuge Retention Capacity (CRC)

A centrifuge retention capacity (CRC) of the particulate water absorbing agent obtained by the present invention is normally not less than 5 g/g, preferably not less than 10 g/g, more preferably not less than 20 g/g, even more preferably not less than 25 g/g, and particularly preferably not less than 27 g/g. An upper limit value of the CRC is not particularly limited. However, from the viewpoint of the balance between the CRC and other physical properties, the upper limit value of the CRC is preferably not more than 50 g/g, more preferably not more than 45 g/g, and even more preferably not more than 40 g/g. A particulate water absorbing agent having a CRC of less than 5 g/g absorbs a small amount of water and may be not be suitable for use for an absorbent body in an absorbent article such as a disposable diaper. On the other hand, with use of a particulate water absorbing agent having a CRC of more than 50 g/g for an absorbent body, it may be not be possible to obtain an absorbent article excellent in speed of absorbing liquid. The CRC of less than 5 g/g or more than 50 g/g is therefore not preferable. Note that the CRC can be controlled with use of the above-described internal crosslinking agent, the above-described surface-crosslinking agent, and/or the like.

[3-2] Fluid Retention Capacity under Pressure (AAP)

A fluid retention capacity under pressure (AAP 0.7 psi) of the particulate water absorbing agent obtained by the present invention is preferably not less than 10 g/g, more preferably not less than 15 g/g, even more preferably not less than 20 g/g, particularly preferably not less than 22 g/g, and most preferably not less than 24 g/g. An upper limit value of the AAP 0.7 psi is not particularly limited but is preferably not more than 40 g/g, from the viewpoint of the balance between the AAP 0.7 psi and other physical properties. In a case where an AAP 0.7 psi of a particulate water absorbing agent is less than 10 g/g, use of such a particulate water absorbing agent for an absorbent body may make it impossible to obtain an absorbent article which causes less liquid release (generally, also referred to as "re-wet") in a case where a load is applied to the absorbent body. The AAP 0.7 psi of less than 10 g/g is therefore not preferable. Meanwhile, an AAP 0.3 psi is preferably not less than 20 g/g, more preferably not less than 24 g/g, and even more preferably not less than 28 g/g (an upper limit is approximately 45 g/g).

[3-3] Water-Soluble Component (Ext)

A water-soluble component (Ext) of the particulate water absorbing agent obtained by the present invention is normally not more than 50 weight %, preferably not more than 35 weight %, more preferably not more than 25 weight %, even more preferably not more than 15 weight % and particularly preferably not more than 10 weight %. A water absorbing agent having an Ext of more than 50 weight % may have a low gel strength and an inferior liquid permeability. Use of such a water absorbing agent for an absorbent body may make it impossible to obtain a particulate water absorbing agent which causes less liquid release (re-wet) in a case where a load is applied to the absorbent body. The Ext of more than 50 weight % is therefore not preferable. Note that the Ext can be controlled with use of an internal crosslinking agent or the like.

[3-4] Moisture Content

A moisture content of the particulate water absorbing agent obtained by the present invention is preferably in a range calculated from the resin solid content described in the above [2-3] drying step. The resin solid content is a value calculated from a drying loss, and the moisture content is defined as (100-resin solid content). The moisture content of the particulate water absorbing agent in accordance with the present invention is therefore preferably not more than. 20 weight %, more preferably 1 weight % to 15 weight %, even more preferably 2 weight % to 10 weight %, and particularly preferably 3 weight % to 8 weight %. The moisture content in the above range leads to improvement in impact resistance of the particulate water absorbing agent and improvement in water absorption speed of the particulate water absorbing agent. The moisture content in the above range is therefore preferable.

[4] Applications of particulate water absorbing agent

Applications of the particulate water absorbing agent obtained by the production method in accordance with the present invention is not limited to a particular one, and can be used for various absorbent articles including sanitary materials such as disposable diapers, sanitary napkins, and incontinence pads, agricultural and horticultural water retaining agents, waste liquid solidifiers, industrial waterproofing agents and the like.

The present invention is configured as below:

1. A method for producing a particulate water absorbing agent containing a polyacrylic acid (salt)-based water-absorbing resin as a main component, the method including:

a polymerization step of polymerizing an acrylic acid (salt)-based aqueous monomer solution so as to obtain a crosslinked hydrogel polymer;

a drying step of drying said crosslinked hydrogel polymer so as to obtain a dried polymer;

a classification step of classifying a polymer subjected to classification; and a surface-crosslinking step of surface-crosslinking an unsurface-crosslinked water-absorbing resin powder, wherein the classification step is carried out at least either or both of before and/or after the surface-crosslinking step but after said drying step, and wherein a hole shape of a classification sieve used in the classification step is irregular polygonal or non-circular.

2. The method according to 1, wherein the hole shape of the classification sieve is rectangular or oval.

3. The method according to 1 or 2, wherein the classification step is carried out after the surface-crosslinking step.

4. The method according to any one of 1 to 3, wherein a ratio of length of a major axis to a minor axis of a hole of the classification sieve is not less than 1.2.

5. The method according to any one of 1 to 4, wherein a fluid retention capacity under pressure (AAP) of the polymer subjected to classification that is supplied in the classification step is not less than 20 g/g.

6. The method according to any one of 1 to 5, wherein a bulk specific gravity of the polymer subjected to classification that is supplied in the classification step is not less than 0.50 g/cm$^3$.

7. The method according to any one of 1 to 6, wherein not less than 50 weight % of the polymer subjected to classification that is supplied in the classification step has a particle diameter of less than 600 μm.

8. The method according to any one of 1 to 7, wherein the classification sieve has a metal sieve mesh whose wire diameter and shape are different.

9. The method according to 8, wherein the metal sieve mesh is made of a round wire and/or a flat wire.

10. The method according to any one of 1 to 9, wherein the classification step is performed by a classification apparatus, which is an oscillating classification apparatus.

11. The method according to any one of 1 to 10, wherein the crosslinked hydrogel polymer is obtained through droplet polymerization in a vapor phase or in an organic phase.

12. The method according to any one of 1 to 11, further including a step of adding a classification aid to:

the polymer subjected to classification that is supplied in the classification step; and/or the water-absorbing resin powder obtained in the classification step.

13. The method according to any one of 1 to 12, wherein a temperature of the polymer subjected to classification that is supplied in the classification step is 40° C. to 100° C.

14. The method according to any one of 10 to wherein a temperature of the classification apparatus used in the classification step is set at 40° C. to 80° C.

15. The method according to any one of 1 to 14, wherein in the classification step, the classification sieve having a hole shape of irregular polygons or non-circles is used to classify a water-absorbing resin after the drying step so as to remove coarse particles.

16. The method according to 15, wherein the classification sieve whose hole has a minor-axis mesh size of 600 μm to 1000 μm is used to remove the coarse particles.

17. The method according to any one of 1 to 13, wherein, in the classification step, the classification sieve having a hole shape of irregular polygons or non-circles is used to classify a water-absorbing resin after the drying step so as to remove fine particles; and wherein a hole of the classification sieve has a minor-axis mesh size of 45 μm to 300 μm.

18. The method according to any one of 10 to 13 and 15 to 17, wherein classification is performed with a temperature inside the classification apparatus or a temperature of the classification sieve being 40° C. to 120° C., and/or with an atmospheric dew point being not more than 40° C.

19. The method according to any one of 1, 2 and 4 to 18, wherein, on condition that classification is performed multiple times before or after surface-crosslinking, the classification sieve having a hole shape of irregular polygons or non-circles is used either once or multiple times in the first, third or subsequent classification.

20. The method according to any one of 1 to 19, wherein the classification step using the classification sieve having a hole shape of irregular polygons or non-circles is carried out for a water-absorbing resin, except for the water-absorbing resin defined below:

a water-absorbing resin remaining on a sieve used to classify a surface-crosslinked water-absorbing resin, said sieve having a smallest mesh size out of at least two kinds of sieves that are used for classification, each of which has a mesh size ranging from not less than 150 μm to not more than 850 μm.

EXAMPLES

The following description will discuss the present invention on the basis of Production Examples, Examples, and Comparative Examples. Note, however, that the present invention is not limited to the descriptions thereof. Also note that unless otherwise specified, physical properties of a water-absorbing resin were measured under the following conditions: room temperature (20° C. to 25° C.)/relative humidity of 40% RH to 50% RH.

[Measurement of Physical Properties of Particulate Water Absorbing Agent]

The following description will discuss measurement of physical properties of a particulate water absorbing agent. In a case where a measurement target is, for example, a water-absorbing resin powder, the term "particulate water absorbing agent" should be replaced with "water-absorbing resin powder".

(a) CRC

The centrifuge retention capacity (CRC; a value at 30 minutes of a fluid retention capacity of a 0.9 weight % aqueous sodium chloride solution) of a particulate water absorbing agent in accordance with the present invention was measured according to an EDANA method (ERT 441.2-02). Note that in a case where the particulate water absorbing agent was a particulate water absorbing agent (Example 11 (Table 4) below) which was made of coarse particles having a particle diameter of not less than 850 μm and which had a low water absorption speed, a value at 2 hours of the CRC of that particulate water absorbing agent was also measured.

(b) AAP

The fluid retention capacity under pressure (a value at 60 minutes of AAP) of a particulate water absorbing agent in accordance with the present invention was measured according to an EDANA method (ERT 442.2-02). Note that in the present invention, Table 3 shows values measured under a load of 2.06 kPa (0.3 psi) and Tables 1 and 2 each show values measured in cases where the load was changed to 4.83 kPa (0.7 psi).

(c) Ext

The water-soluble component (Ext) of a particulate water absorbing agent in accordance with the present invention was measured according to an EDANA method (ERT 470.2-02).

(d) PSD

The PSD of a particulate water absorbing agent in accordance with the present invention was measured according to an EDANA method (ERT 420.2-02). Note that the weight average particle diameter (D50) and the logarithmic standard deviation (σζ) of particle size distribution were measured according to "(3) Mass-Average Particle Diameter (D50) and Logarithmic Standard Deviation (σζ) of Particle Diameter Distribution" disclosed in U.S. Pat. No. 7,638,570.

(e) Bulk Specific Gravity

The bulk specific gravity of a particulate water absorbing agent in accordance with the present invention was measured according to an EDANA method (ERT 460.2-02).

[0197]

(f) SFC

The saline flow conductivity (SFC) of a particulate water absorbing agent in accordance with the present invention was measured in accordance with U.S. Pat. No. 5,669,894.

(g) CRC+AAP

The CRC+AAP of a particulate water absorbing agent in accordance with the present invention was obtained by calculating the sum of CRC and AAP which were obtained in the above (a) and (b), according to U.S. Pat. No. 7,915,363 (Patent Literature 35) and U.S. Pat. No. 5,409,771 (Patent Literature 36).

(h) pH

The pH of a particulate water absorbing agent in accordance with the present invention was measured according to an EDANA method (ERT 400.2-02).

[Production Example 1] Production Example of Spherical Water-Absorbing Resin Powder by Continuous Droplet Polymerization Method With reference to Japanese Patent Application Tokugan No. 2014-246914 (and the PCT international application thereof (PCT/JP2015/084047), International Filing Date: Dec. 3, 2015), a spherical water-absorbing resin powder (1) was produced by a continuous droplet polymerization method.

First, the following devices/apparatuses were used: a static mixer (manufactured by Noritake Co., Ltd.; T3-15) as a mixing apparatus; a needle-shaped stainless steel (SUS316) tube (inner diameter: 0.1 mm, and outer diameter: 1/16 inches) a feeding device; a PFA tube (inner diameter: 4 mm, outer diameter: 6 mm, and whole length: 60 m) formed into a spiral shape, as a reactor; and a solid-liquid separation device utilizing gravitational sedimentation, as a separation device.

In a preparation step for a polymerization reaction, n-heptane and hydrofluoroether (product name: Novec (registered trademark) 7300/Sumitomo 3M Ltd.) were mixed at a weight ratio of 1.0:2.8 to give a mixed solvent (specific gravity: 1.18 g/mL). This mixed solvent was introduced into the reactor, the separation device and a tube connecting the reactor and the separation device. Then, circulation of the mixed solvent was started at a flow rate of 240 mL/min, by causing a liquid feed pump to operate. Further, a heat exchanger was caused to operate so as to set the temperature (hereinafter, referred to as "set temperature") of the organic solvent present to 85° C. in a region where a monomer composition was to be introduced in the reactor.

Next, acrylic acid, a 48.5 weight % aqueous sodium hydroxide solution and ion-exchange water were mixed with one another. To a resultant mixture, polyethyleneglycol diacrylate (average degree of polymerization: 9) and diethylenetriamine pentaacetic acid trisodium were further added, so that an aqueous monomer solution (1) was prepared. While the temperature of the aqueous monomer solution (1) was kept at 25° C., nitrogen substitution was performed by blowing nitrogen gas into the aqueous monomer solution (1). Meanwhile, separately, a 10 weight % aqueous sodium persulfate solution (1) was prepared by mixing sodium persulfate and ion-exchange water. Then, nitrogen substitution was performed by blowing nitrogen gas into the aqueous sodium persulfate solution (1).

Subsequently, the aqueous monomer solution (1) and the aqueous sodium persulfate solution (1), which were obtained by the above operations, were separately fed to the mixing apparatus (static mixer) and mixed in the mixing apparatus, so that a monomer composition (1) was prepared. The monomer composition (1) had a monomer concentration of 45 weight % and a neutralization rate of 75 mol %. Further, the amount of the polyethyleneglycol diacrylate, which served as an internal crosslinking agent, was 0.08 mol % relative to the amount of monomers. The amount of the diethylenetriamine pentaacetic acid trisodium, which served as a chelating agent, was 100 ppm relative to the amount of monomers. In addition, the amount of the sodium persulfate, which served as a polymerization initiator, was 0.1 g/mol relative to the amount of monomers.

Next, the monomer composition (1) prepared by the mixing apparatus (static mixer) was rapidly supplied in the form of liquid to the feeding device. Thereafter, the monomer composition (1) was introduced at a flow rate of 10 mL/min (11.8 g/min) into the organic solvent which filled the reactor, by use of the needle-shaped stainless steel tube (inner diameter: 0.1 mm) such that the direction of the flow of the monomer composition (1) was the same as (parallel to) the direction in which the organic solvent circulated. Note that the solution temperature of the monomer composition (1) prior to introduction of the organic solvent was kept at 25° C. The monomer composition (1) introduced through the needle was dispersed in the form of droplets in the organic solvent. The ratio (W/O ratio) of the monomer composition (1) and the organic solvent was 4.2 volume %.

The droplets of the monomer composition (1) (hereinafter, simply referred to as "droplets") moved together with the organic solvent inside the reactor. As the polymerization reaction proceeds, the monomer composition (1) turned into a microspherical hydrogel (hereinafter, referred to "spherical gel") while moving. After approximately 60 seconds from the introduction of the monomer composition (1) into the reactor, the monomer composition (1) reached a position that was approximately 20 m from an inlet of the monomer composition (1). At this position, an aggregate formed as a result of adhesion of microspherical gel particles to one another was observed. Further, after approximately 90 seconds from the introduction, a hydrogel (1) made of microspherical-gel aggregates of 2 mm to 3 mm in diameter was observed (at a position that was approximately 30 m from the inlet).

The hydrogel (1) obtained through a series of the above operations were continuously discharged from the reactor, together with the organic solvent. Note that in Example 1, a polymerization time from the start of the introduction of the monomer composition (1) into the reactor to the first discharge of the hydrogel (1) from the reactor was 181 seconds. Further, the solution temperature of the organic solvent was 85° C. in the vicinity of an outlet of the hydrogel (1).

The hydrogel (1) and the organic solvent which had been discharged from the reactor were directly fed into the separation device, continuously. In the separation device, gravitational sedimentation was used to separate between the hydrogel (1) and the organic solvent. Note that after the temperature of the organic solvent separated from the hydrogel (1) by the separation device was adjusted by the heat exchanger to a set temperature of 85° C., the organic solvent was supplied to the reactor again. The hydrogel (1) thus obtained was in the form of an aggregate in which the microspherical gel particles adhered to one another. That hydrogel (1) was in the form of an aggregate (granulated material of spherical gel particles) having a particle diameter of approximately 2 mm to 3 mm, into which primary particles having a weight average particle diameter of approximately 300 µm lightly aggregated.

The hydrogel (1) obtained by the above operations was dried at 180° C. for 50 minutes, and then disaggregated, so that a dried polymer (1) was obtained. Note that the dried polymer (1) was a spherical material or a granulated material thereof, so that the dried polymer (1) was directly supplied in the classification step. Therefore, a polymer (1) subjected to classification in Production Example 1 was the dried polymer (1).

Thereafter, the polymer (1) subjected to classification was classified by using a JIS standard sieve having a mesh size of 4 mm, and further classified by using JIS standard sieves having respective mesh sizes of 710 µm and 150 µm, so that a water-absorbing resin powder (1) was obtained. This water-absorbing resin powder (1) was a mixture of spherical particles and a granulated material thereof.

Example 1

A surface-crosslinking agent solution containing 0.4 parts by weight of ethylene carbonate, 0.7 parts by weight of propylene glycol and 3 parts by weight of water was uniformly mixed into 100 parts by weight of the water-absorbing resin powder (1) obtained in Production Example 1 which was made of spherical particles and a granulated material thereof. Then, heat treatment was performed at 195° C. for 30 minutes.

Subsequently, water-absorbing resin particles (approximately 10 g) of resultant spherical particles and a granulated material thereof were classified by using a sieve (inner diameter: 75 mm) in which a mesh (generally also called a Ton-Cap mesh) having rectangular openings (apertures whose long-side length is 636 µm and short-side length is 253 µm (a ratio of the long-side length to the short-side length: 2.51), and a mesh wire diameter being 170 µm) was stretched. Then, particles having passed through the sieve were removed. Note that sieve classification was performed for 5 minutes by using, as an oscillating classification apparatus, a low-tap type sieve shaker (product name: "ES-65 sieve shaker", manufactured by Sieve Factory Iida Co., Ltd.) that was a three-dimensional oscillating classification apparatus. Particles obtained as a result of the sieve classification were referred to as a particulate water absorbing agent (1). Table 1 shows physical properties of the particulate water absorbing agent (1).

Comparative Example 1-1

The water-absorbing resin particles in Example 1 prior to the sieve classification with use of the Ton-Cap mesh were referred to as a comparative particulate water absorbing agent (1-1). Table 1 shows physical properties of the comparative particulate water absorbing agent (1-1).

Comparative Example 1-2

Operations (surface-crosslinking and classification) were performed as in Example 1 except that the Ton-Cap mesh in Example 1 was replaced by a JIS standard sieve (JIS Z8801-1; inner diameter of 75 mm) in which a mesh having a square mesh openings (apertures: 250 µm on a side, and mesh wire diameter: 160 µm) was stretched. The operations produced a comparative particulate water absorbing agent (1-2). Table 1 shows physical properties of the comparative particulate water absorbing agent (1-2) thus produced.

Example 2

Operations (surface-crosslinking and classification) were performed as in Example 1 except that a time for heat treatment was changed from 30 minutes in Example 1 to 50 minutes. The operations produced a particulate water absorbing agent (2). Table 1 shows physical properties of the particulate water absorbing agent (2) thus produced.

Comparative Example 2-1

The water-absorbing resin particles in Example 2 prior to the sieve classification with use of the Ton-Cap mesh were referred to as a comparative particulate water absorbing agent (2-1). Table 1 shows physical properties of the comparative particulate water absorbing agent (2-1).

Comparative Example 2-2

Operations (surface-crosslinking and classification) were performed as in Example 1 except that the Ton-Cap mesh in Example 2 was replaced by a JIS standard sieve (JIS Z8801-1; inner diameter of 75 mm) in which a mesh having a square mesh openings (apertures: 250 µm on a side, and mesh wire diameter: 160 µm) was stretched. The operations produced a comparative particulate water absorbing agent (1-2). Table 1 shows physical properties of the comparative particulate water absorbing agent (1-2) thus produced.

Example 3

Operations (surface-crosslinking and classification) were performed as in Example 1 except that the aqueous surface-crosslinking agent solution in Example 1 was replaced by a surface-crosslinking agent solution containing 0.02 parts by weight of ethyleneglycoldiglycidyl ether, 0.3 parts by weight of ethylene carbonate, 0.5 parts by weight of propylene glycol and 2.5 parts by weigh of water. The operations produced a particulate water absorbing agent (3). Table 1 shows physical properties of the particulate water absorbing agent (3) thus produced.

Comparative Example 3-1

The water-absorbing resin particles in Example 3 prior to the sieve classification with use of the Ton-Cap mesh were referred to as a comparative particulate water absorbing agent (3-1). Table 1 shows physical properties of the comparative particulate water absorbing agent (3-1).

Comparative Example 3-2

Operations (surface-crosslinking and classification) were performed as in Example 1 except that the Ton-Cap mesh in Example 3 was replaced by a JIS standard sieve (JIS Z8801-1; inner diameter of 75 mm) in which a mesh having a square mesh openings (apertures: 250 μm on a side, and mesh wire diameter: 160 μm) was stretched. The operations produced a comparative particulate water absorbing agent (3-2). Table 1 shows physical properties of the comparative particulate water absorbing agent (3-2) thus produced.

Example 4

Operations (surface-crosslinking and classification) were performed as in Example 3 except that a time for heat treatment was changed from 30 minutes in Example 3 to 60 minutes. The operations produced a particulate water absorbing agent (4). Table 1 shows physical properties of the particulate water absorbing agent (4) thus produced.

Comparative Example 4-1

The water-absorbing resin particles in Example 4 prior to the sieve classification with use of the Ton-Cap mesh were referred to as a comparative particulate water absorbing agent (4-1). Table 1 shows physical properties of the comparative particulate water absorbing agent (4-1).

Comparative Example 4-2

Operations (surface-crosslinking and classification) were performed as in Example 1 except that the Ton-Cap mesh in Example 4 was replaced by a JIS standard sieve (JIS Z8801-1; inner diameter of 75 mm) in which a mesh having a square mesh openings (apertures: 250 μm on a side, and mesh wire diameter: 160 μm) was stretched. The operations produced a comparative particulate water absorbing agent (4-2). Table 1 shows physical properties of the comparative particulate water absorbing agent (4-2) thus produced.

absorbing agents of Comparative Examples 1-2 to 4-2 employing a JIS standard sieve having square mesh openings. Further, the particulate water absorbing agents of all Examples 1 to 4 each exhibited an AAP that was higher by +0.3 g/g to +0.5 g/g than that of a corresponding comparative particulate water absorbing agent prior to sieve classification.

Further, the sum of CRC and AAP (CRC+AAP) in each of all Examples 1 to 4 improved by +0.1 g/g to +1.1 g/g as compared to that of a corresponding one of the comparative particulate water absorbing agents of Comparative Examples 1-2 to 4-2. In addition, the particulate water absorbing agents of all Examples 1 to 4 each exhibited the sum of CRC and AAP (CRC+AAP) that was higher by +0.4 g/g to +1.5 g/g than that of a corresponding comparative particulate water absorbing agent prior to sieve classification.

[Production Example 2] Production Example of Water-Absorbing Resin which was Produced by Aqueous Solution Polymerization and Ground to have Uneven Shapes As a production apparatus for an particulate water absorbing agent containing a polyacrylic acid (salt)-based water-absorbing resin as a main component, prepared was a continuous production apparatus which carried out a polymerization step, a gel-crushing step, a drying step, a pulverizing step, a classification step, a surface-crosslinking step, a cooling step, a sizing step, and transportation steps each joining one step with another step. Note that Production Example 2 included steps up to the classification step and that the steps including the surface-crosslinking step and the steps subsequent to the surface-crosslinking step were carried out in Examples 5 to 9 and Comparative Example 5 below.

TABLE 1

| | | | | CRC [g/g] | AAP [g/g] | CRC + AAP [g/g] |
|---|---|---|---|---|---|---|
| Exemplification 1 | Before sieve classification | Comparative Example 1-1 | Comparative particulate water absorbing agent (1-1) | 30.7 | 24.4 | 55.1 |
| | JIS sieve | Comparative Example 1-2 | Comparative particulate water absorbing agent (1-2) | 30.5 | 24.5 | 55.0 |
| | Ton-Cap sieve | Example 1 | Particulate water absorbing agent (1) | 30.8 | 24.8 | 55.6 |
| Exemplification 2 | Before sieve classification | Comparative Example 2-1 | Comparative particulate water absorbing agent (2-1) | 27.7 | 24.5 | 52.2 |
| | JIS sieve | Comparative Example 2-2 | Comparative particulate water absorbing agent (2-2) | 27.9 | 24.5 | 52.4 |
| | Ton-Cap sieve | Example 2 | Particulate water absorbing agent (2) | 27.8 | 24.8 | 52.6 |
| Exemplification 3 | Before sieve classification | Comparative Example 3-1 | Comparative particulate water absorbing agent (3-1) | 31.1 | 25.9 | 57.0 |
| | JIS sieve | Comparative Example 3-2 | Comparative particulate water absorbing agent (3-2) | 31.4 | 28.0 | 57.4 |
| | Ton-Cap sieve | Example 3 | Particulate water absorbing agent (3) | 32.1 | 26.4 | 58.5 |
| Exemplification 4 | Before sieve classification | Comparative Example 4-1 | Comparative particulate water absorbing agent (4-1) | 28.4 | 24.7 | 53.1 |
| | JIS sieve | Comparative Example 4-2 | Comparative particulate water absorbing agent (4-2) | 28.6 | 24.9 | 53.5 |
| | Ton-Cap sieve | Example 4 | Particulate water absorbing agent (4) | 28.4 | 25.2 | 53.6 |

Note)
All the above particulate water absorbing agents had pH of approximately 6.1.

(Results)

Each of the particulate water absorbing agents of all Examples 1 to 4 employing, as a classification sieve, a Ton-Cap mesh having rectangular mesh openings exhibited an AAP that was higher by +0.3 g/g to +0.4 g/g than that of a corresponding one of the comparative particulate water There may be one line for carrying out the above steps or two or more lines for carrying out the above steps. In a case where the number of lines is two or more, a production capacity may be indicated by a total production capacity of all the two or more lines. The continuous production apparatus was used to continuously produce a particulate water absorbing agent containing a poly acrylic acid (salt)-based water-absorbing resin powder as a main component.

First, an aqueous monomer solution (2) was prepared. The aqueous monomer solution (2) contained 193.3 parts by weight of acrylic acid, 64.4 parts by weight of a 48 weight % aqueous sodium hydroxide solution, 1.26 parts by weight of polyethyleneglycol diacrylate (average n number: 9), 52 parts by weight of a 0.1 weight % aqueous pentasodium ethylenediamine tetra(methylene phosphonate) solution, and 134 parts by weight of deionized water.

Second, the aqueous monomer solution (2) whose temperature was adjusted to 40° C.; was continuously fed by a metering pump, and then 97.1 parts by weight of a 48 weight % aqueous sodium hydroxide solution was continuously line-mixed with the aqueous monomer solution (2). Note that the temperature of the aqueous monomer solution (2) was increased to 85° C. due to heat of neutralization.

Furthermore, 8.05 parts by weight of a 4 weight % aqueous sodium persulfate solution was continuously line-mixed with the aqueous monomer solution (2), and then a resultant mixture was continuously fed into a continuous polymerization device having a planar polymerization belt with dams at both ends, so that the fed mixture had a thickness of approximately 7.5 mm. Thereafter, polymerization (polymerization time: 3 minutes) was performed continuously, so that a belt-shaped crosslinked hydrogel polymer (2) was obtained.

Next, the belt-shaped crosslinked hydrogel polymer (2) was sequentially cut, along the width direction with respect to the traveling direction of the polymerization belt, at regular intervals so that the length of a cut piece of the belt-shaped crosslinked hydrogel polymer (2) would be approximately 300 mm in the traveling direction. Then, the belt-shaped crosslinked hydrogel polymer (2) was fed into a screw extruder and gel-crushed. Thereafter, a resultant polymer obtained from the belt-shaped crosslinked hydrogel polymer (2) was dried at 185° C. for 30 minutes on a through-flow belt.

Subsequently, all of a dried polymer (2) obtained in the drying step was continuously fed into a three-stage roll mill for pulverization (pulverizing step). Thereafter, the dried polymer (2) was subjected to classification with use of JIS standard sieves having mesh sizes 710 µm and 175 µm, respectively, so that a water-absorbing resin powder (2) ground to have an uneven shape was obtained.

The water-absorbing resin powder had a weight average particle diameter (D50) of 350 µm, a logarithmic standard deviation (σζ) of particle size distribution of 0.33, a CRC of 31.6 g/g, a water-soluble component of 6.8 weight %, and 150 µm passing particles (a ratio of particles that passed through a sieve having a mesh size of 150 µm) of 0.6 weight %.

Comparative Example 5

A covalent bonding surface-crosslinking agent solution containing 0.3 parts by weight of ethylene carbonate, 0.6 parts by weight of propylene glycol and 3.0 parts by weight of deionized water was uniformly mixed into 100 parts by weight of the water-absorbing resin powder (2) obtained in Production Example 2. Next, a resultant mixture was subjected to heat treatment at 208° C. for approximately 40 minutes, and then cooled. Further, an ionic bonding surface-crosslinking agent solution containing 1.17 parts by weight of a 27.5 weight % aqueous aluminum sulfate solution (8 weight % based on aluminum oxide), 0.196 parts by weight of a 60 weight % aqueous sodium lactate solution and 0.029 parts by weight of propylene glycol was uniformly mixed in the mixture.

The above operations produced comparative water-absorbing resin particles (5). The comparative water-absorbing resin particles (5) were classified for 5 minutes by using an oscillating classification apparatus in which classification sieves having mesh sizes below were provided, so that the particle size of the comparative water-absorbing resin particles (5) were controlled. Note that this classification step corresponds to the sizing step described in Production Example 2.

The classification step (sizing step) in Comparative Example 5 was performed by using JIS standard sieves (JIS Z8801-1) having mesh sizes of 500 µm and 250 µm, respectively. Note that the comparative water-absorbing resin particles (5) supplied in the classification step was at a temperature of 40° C., and had a weight of approximately 10 g. Further, the oscillating classification apparatus had a temperature thereof being retained and an atmospheric dew point during the classification step of approximately 6° C., and a sieve inner diameter of 75 mm. The oscillating classification apparatus was a low-tap type sieve shaker (product name: "ES-65 sieve shaker", manufactured by Sieve Factory Iida Co., Ltd.) that was a three-dimensional oscillating classification apparatus.

The JIS sieve having a mesh size of 500 µm was intended to remove coarse particles, and may be referred to as "On-Cut sieve". Meanwhile, the JIS standard sieve having a mesh size of 250 µm was intended to remove fine powder, and may be referred to as a "Pass-Cut sieve". Further, the JIS sieve having a mesh size of 500 µm and a JIS standard sieve having a mesh size of 250 µm may be expressed as "JIS-500" and "JIS-250", respectively.

As a result of sieve classification into 500 µm to 250 µm particles, a comparative particulate water absorbing agent (5) was obtained. Table 2 and FIG. 1 show physical properties of the comparative particulate water absorbing agent (5).

Example 5

Operations were performed as in Comparative Example 5 except that the JIS standard sieves having two different mesh sizes, respectively, used in the classification step (sizing step) in Comparative Example 5 were replaced by Ton-Cap sieves (inner diameter: 75 mm) corresponding to the above JIS standard sieves, respectively.

In other words, the On-Cut sieve in Comparative Example 5 was changed to a mesh sieve (which may be also referred to as "TonCap 500/1480") having rectangular holes (mesh openings) (long-side length: 1480 µm×short-side length: 500 µm, a ratio of the long-side length to the short-side length: 2.96, and a mesh wire diameter: 300 µm/330 µm), while the Pass-Cut sieve in Comparative Example 5 was changed to a mesh sieve (which may be also referred to as "TonCap 253/636") having rectangular holes (mesh openings) (long-side length: 636 µm×short-side length: 253 µm, a ratio of the long-side length to the short-side length: 2.51, and a mesh wire diameter: 170 µm). Then, the classification step (sizing step) was performed.

As a result of the classification step (sizing step), a particulate water absorbing agent (5) was obtained. Table 2 and FIG. 1 show physical properties of the particulate water absorbing agent (5).

Example 6

Operations were performed as in Comparative Example 5 except that a Ton-Cap sieve (inner diameter: 75 mm) corresponding to the JIS standard sieve having a mesh size of 500 µm was used in place of the JIS standard sieve having a mesh size of 500 µm, which was one of the JIS standard sieves used in the classification step (sizing step) in Comparative Example 5 and having two different mesh sizes, respectively.

In other words, the On-Cut sieve in Comparative Example 5 was changed to a mesh sieve having rectangular holes (mesh openings) (long-side length: 1480 µm×short-side length: 500 µm, a ratio of the long-side length to the short-side length: 2.96, and a mesh wire diameter: 300 µm/330 µm). Then, the classification step (sizing step) was performed.

As a result of the classification step (sizing step), a particulate water absorbing agent (6) was obtained. Table 2 and FIG. 1 show physical properties of the particulate water absorbing agent (6).

Example 7

Operations were performed as in Comparative Example 5 except that: a Ton-Cap sieve (inner diameter: 75 mm) corresponding to the JIS standard sieve having a mesh size of 500 µm was used in place of the JIS standard sieve having a mesh size of 500 µm, which was one of the JIS standard sieves used in the classification step (sizing step) in Comparative Example 5 and having two different mesh sizes, respectively; and the mesh size of the Pass-Cut sieve was changed to 350 µm.

In other words, the On-Cut sieve in Comparative Example 5 was changed to a mesh sieve having rectangular holes (mesh openings) (long-side length: 1480 µm×short-side length: 500 µm, a ratio of the long-side length to the short-side length: 2.96, and a mesh wire diameter: 300 µm/330 µm), while the Pass-Cut sieve in Comparative Example 5 was changed to a JIS standard sieve (which may be also referred to as "JIS-350") having a mesh size of 350 µm. Then, the classification step (sizing step) was performed.

As a result of the classification step (sizing step), a particulate water absorbing agent (7) was obtained. Table 2 and FIG. 1 show physical properties of the particulate water absorbing agent (7).

particulate water absorbing agent (5) which was classified by the JIS standard sieves. That is, each of the particulate water absorbing agents (5) to (7) exhibited an AAP that was higher by +0.5 g/g to +0.7 g/g, a CRC that was higher by +0.2 g/g to +1.1 g/g, and the sum of CRC and AAP (CRC+AAP) that was higher by +0.7 g/g to +1.8 g/g than those of the comparative particulate water absorbing agent (5). Further, it is clear from results of Examples 5 to 7 that a Ton-Cap sieve is preferably used for both the On-Cut sieve and the Pass-Cut sieve.

Meanwhile, the liquid permeability (e.g., SFC and GBP) and the fluid retention capacity without load (e.g., CRC) are physical properties incompatible with each other and it is difficult to have both a better liquid permeability and a better fluid retention capacity without load. However, it is found from a comparison between Comparative Example 5 (SFC=124 at CRC=27.5 g/g) and Example 6 (SFC=129 at CRC=27.7 g/g), that both of the liquid permeability and the fluid retention capacity can be improved (CRC: +0.2 g/g, and SFC: +5) by using a Ton-Cap sieve in adjustment of a product particle size.

Examples 8 and 9

Operations were performed as in Example 5 except that the temperature of the water-absorbing resin particles supplied in the classification step in Example 5 was changed to 20° C. (Example 8) and that the atmospheric dew point during the classification step was changed to 45° C. (Example 9). As a result, a particulate water absorbing agent (8) and a particulate water absorbing agent (9) were obtained in Examples 8 and 9, respectively.

In Examples 8 and 9, a short-time classification led to a result equivalent to that in Example 5. However, in a case where classification was repeatedly carried out for a long time, adhesion of a particulate water absorbing agent to a sieve mesh was observed. In other words, it is clear that the classification conditions (the temperature and the atmospheric dew point during classification) of the present invention which are not disclosed in Patent Literature 16 (unpublished prior art) are even more preferable.

Comparative Example 6

The following classification step was performed with respect to a commercially available perfect-sphere-shaped

TABLE 2

| | On-Cut Sieve [µm] | Pass-Cut Sieve [µm] | | CRC [g/g] | AAP 0.7 psi [g/g] | CRC + AAP [g/g] | SFC [1)] |
|---|---|---|---|---|---|---|---|
| Comparative Example 5 | JIS-500 | JIS-250 | Comparative particulate water absorbing agent (5) | 27.5 | 23.5 | 51.0 | 124 |
| Example 5 | TonCap 500/1480 | TonCap 253/636 | Particulate water absorbing agent (5) | 28.6 | 24.2 | 52.8 | — |
| Example 6 | TonCap 500/1480 | JIS-250 | Particulate water absorbing agent (6) | 27.7 | 24 | 51.7 | 129 |
| Example 7 | TonCap 500/1480 | JIS-350 | Particulate water absorbing agent (7) | 28.1 | 24.1 | 52.2 | — |

1) Unit of SFC; [×10$^{-7}$ · cm$^3$ · s · g$^{-1}$]

(Results)

It is clear from Table 2 and FIG. 1 that physical properties improve in a case where classification is carried out by using a Ton-Cap sieve having rectangular holes as compared to a case where classification is carried out by using a JIS standard sieve having square holes.

Specifically, the particulate water absorbing agents (5) to (7), which were classified by a Ton-Cap sieve, exhibited higher physical properties as compared to the comparative polyacrylic acid sodium salt-based water-absorbing resin (CRC: 58 g/g, and AAP 0.3 psi: 36 g/g which are measured values obtained by the applicant) (hereinafter, referred to as "comparative water-absorbing resin particles (6)") which was assumed to have been obtained through reversed phase suspension polymerization and surface-crosslinking that followed the reversed phase suspension polymerization.

In other words, the perfect-sphere-shaped polyacrylic acid sodium salt-based water-absorbing resin was classified for 5 minutes for particle size control, by using an oscillating classification apparatus in which classification sieves having the following mesh sizes were provided.

The classification step (sizing step) in Comparative Example 6 was performed by using JIS standard sieves (JIS Z8801-1) having mesh sizes of 250 μm and 106 μm, respectively. Note that the comparative water-absorbing resin particles (6) provided for the classification step were at a temperature of 40° C. and had a weight of approximately 10 g. Further, the atmospheric dew point during the classification step was approximately 6° C., and the sieves had an inner diameter of 75 mm. The oscillating classification apparatus was a low-tap type sieve shaker (product name: "ES-65 sieve shaker", manufactured by Sieve Factory Iida Co., Ltd.) that was a three-dimensional oscillating classification apparatus.

Note that in Comparative Example 6, the JIS sieve having the above mesh size of 250 μm corresponds to the sieve (On-Cut sieve) for removal of coarse particles, and the JIS standard sieve having the above mesh size of 106 μm (which may be also referred to as "JIS-106") corresponds to the sieve (Pass-Cut sieve) for removal of fine powder.

As a result of sieve classification into 250 μm to 106 μm particles, a comparative particulate water absorbing agent (6), which was substantially perfect-sphere-shaped (degree of sphericity of not less than 0.8), was obtained. Table 3 shows physical properties of the comparative particulate water absorbing agent (6).

Example 10

Operations were performed as in Comparative Example 6 except that a Ton-Cap sieve (inner diameter: 75 mm) corresponding to the JIS standard sieve having a mesh size of 250 μm was used in place of the JIS standard sieve having a mesh size of 250 μm, which was one of the JIS standard sieves used in the classification step (sizing step) in Comparative Example 6 and having two different mesh sizes, respectively.

In other words, the On-Cut sieve in Comparative Example 6 was changed to a mesh sieve having rectangular holes (mesh openings) (long-side length: 636 μm×short-side length: 253 μm, a ratio of the long-side length to the short-side length: 2.96, and a mesh wire diameter: 300 μm/330 μm). Then, the classification step (sizing step) was performed.

As a result of the classification step (sizing step), a particulate water absorbing agent (10), which was substantially perfect-sphere-shaped (degree of sphericity of not less than 0.8), was obtained. Table 3 shows physical properties of the particulate water absorbing agent (10).

(Results)

It is clear from Table 3 that classification with use of a Ton-Cap sieve having rectangular holes improves physical properties as compared to a case where classification was carried out by using a JIS standard sieve having square holes.

Specifically, the particulate water absorbing agent (10) classified by the Ton-Cap sieve exhibited a CRC that was higher by +5.1 g/g, and the sum of CRC and AAP (CRC+AAP) that was higher by +3.9 g/g as compared to the comparative particulate water absorbing agent (6) classified by using the JIS standard sieve. Further, it is also clear that a yield significantly increases from 58.8 weight % to 82.2 weight %. Note that the "yield" means an amount of a yielded particulate water absorbing agent per a total amount of water-absorbing resin particles subjected to classification with use of a sieve(s).

Furthermore, the substantially perfect-sphere-shaped (degree of sphericity not less than 0.8) water-absorbing resins handled in Comparative Example 6 and Example 10 can be obtained by a reversed phase suspension polymerization method. More specifically, the substantially perfect-sphere-shaped water-absorbing resin can be obtained by: polymerizing (reversed phase suspension polymerization of) an aqueous acrylic acid salt solution (solid content concentration: 30 weight % to 45 weight %) in the form of droplets (particle diameter: several ten micrometersto several hundred micrometers) in a hydrophobic organic solvent in the presence of a surfactant; next, performing azeotropic dehydration in the hydrophobic organic solvent until a solid content concentration becomes 70 weight % to 90 weight %; subsequently, performing surface-crosslinking by addition of a surface-crosslinking agent (e.g., ethyleneglycoldiglycidyl ether) into the hydrophobic organic solvent; thereafter, performing filtration of a resultant water-absorbing resin from the hydrophobic organic solvent or removing the hydrophobic organic solvent by distillation; and after removal of the hydrophobic organic solvent, drying the water-absorbing resin again. In other words, Comparative Example 6 and Example 10 are not only examples of classification of a commercially available water-absorbing resin but also model examples of classification of a spherical water-absorbing resin and a granulated material thereof which have been produced by a reversed phase suspension polymerization method and surface-crosslinked.

[Production Example 3] Production Example of Spherical Dried Polymer by Continuous Droplet Polymerization Method Operations up to a drying step were performed as in Production Example 1 except that the inner diameter of the

TABLE 3

|  | On-Cut Sieve [μm] | Pass-Cut Sieve [μm] |  | CRC [g/g] | AAP 0.3 psi [g/g] | CRC + AAP [g/g] | Yield [wt %] |
|---|---|---|---|---|---|---|---|
| Comparative Example 6 | JIS-250 | JIS-106 | Comparative particulate water absorbing agent (6) | 48.8 | 38.6 | 87.4 | 58.8 |
| Example 10 | TonCap 253/636 | JIS-106 | Particulate water absorbing agent (10) | 53.9 | 37.4 | 91.3 | 82.2 |

Note)
In each of Comparative Example 6 and Example 10, load of AAP was changed to 0.3 psi from 0.7 psi.
Note)
Yield is ratio of 250 μm-106 μm particles after 5-min classification.

needle-shaped stainless steel (SUS316) tube as the feeding device in Production Example 1 was changed to 1 mm and that some of the polymerization conditions in Production Example 1 were changed as below. The operations produced a spherical dried polymer (3).

That is, in a preparation step for a polymerization reaction, n-heptane was used as a solvent. In the n-heptane, 300 ppm of sucrose fatty acid ester (Dai-ichi Kogyo Seiyaku. Co., Ltd.: DK ESTER F-50) that served as a surfactant had been dissolved. Further, the flow rate of circulation by a liquid feed pump in a reactor was changed to 290 mL/min and a heat exchanger was operated such that the organic solvent present in a region where a monomer composition was to be introduced was at a temperature of 90° C.

Next, acrylic acid, a 48.5 weight % aqueous sodium hydroxide solution and ion-exchange water were mixed together. Further, into this mixture, polyethyleneglycol diacrylate (average degree of polymerization: 9), diethylenetriamine pentaacetic acid trisodium and sodium persulfate were added, so that an aqueous monomer solution (3) was prepared. While the temperature of the aqueous monomer solution (3) was kept at 25° C., nitrogen gas was blown into the aqueous monomer solution (3) so as to perform nitrogen substitution. Meanwhile, separately, a 10 weight % aqueous initiator solution (3) was prepared by mixing 2,2'-azobis (propane-2-carboamidine)dihydrochloride and ion-exchange water.

Subsequently, the aqueous monomer solution (3) and the aqueous initiator solution (3) which had been obtained by the above operations were separately fed to a mixing apparatus (static mixer) and mixed in the mixing apparatus, so that a monomer composition (3) was prepared. The monomer composition (3) had a monomer concentration of 43 weight % and a neutralization rate of 73 mol %. Further, the amount of polyethyleneglycol diacrylate, which served as an internal crosslinking agent, was 0.03 mol % relative to the amount of monomers. The amount of diethylenetriamine pentaacetic acid trisodium, which served as a chelating agent, was 200 ppm relative to the amount of monomers. In addition, the amount of each of sodium persulfate and 2,2'-azobis(propane-2-carboamidine)dihydrochloride, which were polymerization initiators, was 0.06 g/mol relative to the amount of monomers.

Thereafter, in the following, operations for polymerization were performed as in Production Example 1.

A hydrogel (3) after polymerization which was obtained through a series of the above operations for polymerization was in the form of spherical particles having a particle diameter of approximately 1 mm to 2 mm. After the hydrogel (3) was dried at 110° C. for 1 hour, drying was further performed at 80° C. for 1 hour. Subsequently, an aggregate of a resultant dried product was disaggregated, so that a dried polymer (3) was obtained.

[Example 11] Classification with use of Ton-Cap sieve, before surface-crosslinking The dried polymer (3) (35 g) obtained in Production Example 3 was classified by using a sieve (inner diameter: 75 mm) in which a mesh (generally also called a Ton-Cap mesh) having rectangular openings (apertures whose long-side length is 1200 μm and short-side length is 911 μm (a ratio of the long-side length to the short-side length: 1.32), and a mesh wire diameter of 500 μm) was stretched. Then, particles which had not passed through the sieve and remained on the sieve were removed. Note that sieve classification was performed for 5 minutes by using, as an oscillating classification apparatus, a low-tap type sieve shaker (product name: "ES-65 sieve shaker", manufactured by Sieve Factory Iida Co., Ltd.) that was a three-dimensional oscillating classification apparatus. The perfect-sphere-shaped particles which had passed through the sieve and obtained as a result of the sieve classification were referred to as a particulate water absorbing powder (11).

A yield of the water-absorbing resin powder (11) was 87 weight % per a total amount (35 g) of the dried polymer (3) which had been classified by the sieve. The water-absorbing resin powder (11) having passed through the Ton-Cap sieve (long-side length: 1200 μm, and short-side length: 911 μm) had a particle size distribution (EDANA method) as follows:

particles having a particle size of not less than 850 μm 63 weight %, particles having a particle size of not less than 600 μm and less than 850 μm: 36 weight %, particles having a particle size of not less than 150 μm and less than 600 μm: 1 weight %, and particles having a particle size of less than 150 μm: 0 weight %.

Next, into 100 parts by weight of the water-absorbing resin powder (11) obtained by classification with use of the Ton-Cap sieve, a surface-crosslinking agent solution containing 0.01 parts by weight of ethyleneglycoldiglycidyl ether, 5 parts by weight of water and 1 part by weight of 2-propanol was uniformly mixed. Thereafter, heat treatment was performed at 35° C. for 1 hour. As a result, surface-crosslinked water-absorbing resin particles (11) were obtained.

The water-absorbing resin particles (11) were not classified after surface-crosslinking, but directly taken as a particulate water absorbing agent (11). Table 4 shows physical properties of this particulate water absorbing agent (11). Note that the particle size distribution of the particulate water absorbing agent (11) was substantially equal to that of the water-absorbing resin powder (11) prior to surface-crosslinking and that the particulate water absorbing agent (11) as a whole was in the form of perfect-sphere-shaped (degree of sphericity not less than 0.8) primary particles though a very small amount of granulated material was present.

Comparative Example 7

Operations (up to a step before surface-crosslinking) were performed as in Example 11 except that the Ton-Cap mesh in the classification before surface-crosslinking in Example 11 was replaced by a JIS standard sieve (JIS Z8801-1; inner diameter: 75 mm) in which a mesh having square mesh openings (apertures: 1000 μm on a side, and a mesh wire diameter: 560 μm) was stretched. The operations produced a comparative water-absorbing resin powder (7). A yield of the comparative water-absorbing resin powder (7) was 73 weight % per a total amount (35 g) of the dried polymer (3) which had been classified by the above sieve.

TABLE 4

|  | CRC (30 min) [g/g] | CRC (2 h) [g/g] | SFC [1] | Yield [wt %] |
| --- | --- | --- | --- | --- |
| Example 11 | 33.0 | 41.0 | 46.0 | 87.0 |
| Comparative Example 7 | — | — | — | 73.0 |

[1] Unit of SFC; $[\times 10^{-7} \cdot cm^3 \cdot s \cdot g^{-1}]$ (Results)

It is clear from Table 4 that a high yield is exhibited even in a case where classification is performed with use of a Ton-Cap sieve before surface-crosslinking, and that particulate water absorbing agent having a high fluid retention capacity (CRC, AAP) and a high liquid permeability (SFC) can be obtained by performing surface-crosslinking after classification.

CONCLUSION

As shown in Examples 1 to 11 and Tables 1 to 4, and FIG. 1, an increase in AAP and an increase in sum of CRC and AAP mean a significant improvement in the current technical level of the water-absorbing resin field. Such increases are difficult to achieve by optimization of conventional polymerization techniques and conventional surface-crosslinking techniques. Further, the present invention also improves the liquid permeability and the classification efficiency.

As described earlier, the present invention is not at all suggested in any of Patent Literatures 1 to 15, Patent Literature 16 that is an unpublished prior application for a patent, and Patent Literatures 17 to 37 that disclose measures to improve the productivity and the performance of a water-absorbing resin, focusing on steps other than the classification step.

INDUSTRIAL APPLICABILITY

A particulate water absorbing agent produced in accordance with the present invention can be used for various water-absorbing resin applications such as various hygienic materials including disposable diapers, sanitary napkins, and the like, and other materials.

The invention claimed is:

1. A method for producing a particulate water absorbing agent containing a polyacrylic acid (salt)-based water-absorbing resin as a main component, the method comprising:
   a polymerization step of polymerizing an acrylic acid (salt)-based aqueous monomer solution so as to obtain a crosslinked hydrogel polymer;
   a drying step of drying said crosslinked hydrogel polymer so as to obtain a dried polymer;
   a classification step of classifying a polymer subjected to classification; and
   a surface-crosslinking step of surface-crosslinking an unsurface-crosslinked water-absorbing resin powder,
   wherein the classification step is carried out at least either or both of before and/or after the surface-crosslinking step but after said drying step, and
   wherein a hole shape of a classification sieve used in the classification step is irregular polygonal or non-circular.

2. The method according to claim 1, wherein the hole shape of the classification sieve is rectangular or oval.

3. The method according to claim 1, wherein the classification step is carried out after the surface-crosslinking step.

4. The method according to claim 1, wherein a ratio of length of a major axis to a minor axis of a hole of the classification sieve is not less than 1.2.

5. The method according to claim 1, wherein a fluid retention capacity under pressure (AAP) of the polymer subjected to classification that is supplied in the classification step is not less than 20 g/g.

6. The method according to claim 1, wherein a bulk specific gravity of the polymer subjected to classification that is supplied in the classification step is not less than 0.50 g/cm3.

7. The method according to claim 1, wherein not less than 50 weight % of the polymer subjected to classification that is supplied in the classification step has a particle diameter of less than 600 μm.

8. The method according to claim 1, wherein the classification sieve has a metal sieve mesh whose wire diameter and shape are different.

9. The method according to claim 8, wherein the metal sieve mesh is made of a round wire and/or a flat wire.

10. The method according to claim 1, wherein the classification step is performed by a classification apparatus, which is an oscillating classification apparatus.

11. The method according to claim 1, wherein the crosslinked hydrogel polymer is obtained through droplet polymerization in a vapor phase or in an organic phase.

12. The method according to claim 1, further comprising a step of adding a classification aid to:
   the polymer subjected to classification that is supplied in the classification step; and/or
   the water-absorbing resin powder obtained in the classification step.

13. The method according to claim 1, wherein a temperature of the polymer subjected to classification that is supplied in the classification step is 40° C. to 100° C.

14. The method according to claim 10, wherein a temperature of the classification apparatus used in the classification step is set at 40° C. to 80° C.

15. The method according to claim 1, wherein, in the classification step, the classification sieve having a hole shape of irregular polygons or non-circles is used to classify a water-absorbing resin after the drying step so as to remove coarse particles.

16. The method according to claim 15, wherein the classification sieve whose hole has a minor-axis mesh size of 600 μm to 1000 μm is used to remove the coarse particles.

17. The method according to claim 1,
   wherein, in the classification step, the classification sieve having a hole shape of irregular polygons or non-circles is used to classify a water-absorbing resin after the drying step so as to remove fine particles; and
   wherein a hole of the classification sieve has a minor-axis mesh size of 45 μm to 300 μm.

18. The method according to claim 10, wherein classification is performed with a temperature inside the classification apparatus or a temperature of the classification sieve being 40° C. to 120° C., and/or with an atmospheric dew point being not more than 40° C.

19. The method according to claim 1, wherein, on condition that classification is performed multiple times before or after surface-crosslinking, the classification sieve having a hole shape of irregular polygons or non-circles is used either once or multiple times in the first, third and subsequent classifications.

20. The method according to claim 1, wherein the classification step using the classification sieve having a hole shape of irregular polygons or non-circles is carried out for a water-absorbing resin, except for the water-absorbing resin defined below:
   a water-absorbing resin remaining on a sieve used to classify a surface-crosslinked water-absorbing resin, said sieve having a smallest mesh size out of at least two kinds of sieves that are used for classification, each of which has a mesh size ranging from not less than 150 μm to not more than 850 μm.

* * * * *